(12) United States Patent
Lawlor

(10) Patent No.: US 8,176,824 B2
(45) Date of Patent: May 15, 2012

(54) MITER SAW WITH BEVEL STOP TOGGLE

(75) Inventor: Michael J. Lawlor, Chicago, IL (US)

(73) Assignee: Robert Bosch GmbH, Stuttgart (DE)

( * ) Notice: Subject to any disclaimer, the term of this patent is extended or adjusted under 35 U.S.C. 154(b) by 514 days.

(21) Appl. No.: 12/431,592

(22) Filed: Apr. 28, 2009

(65) Prior Publication Data
US 2010/0269662 A1    Oct. 28, 2010

(51) Int. Cl.
*B27B 5/00* (2006.01)
(52) U.S. Cl. ................... 83/471.3; 83/477.1; 83/581
(58) Field of Classification Search ............... 83/471.3, 83/471.2, 477.1, 477.2, 473, 477, 663, 781, 83/581
See application file for complete search history.

(56) References Cited

U.S. PATENT DOCUMENTS

| | | | |
|---|---|---|---|
| 5,042,348 A * | 8/1991 | Brundage et al. ............ 83/471.3 |
| 5,675,899 A * | 10/1997 | Webb .............................. 30/390 |
| 6,615,701 B2 | 9/2003 | Hollinger et al. |
| 6,758,123 B2 | 7/2004 | Svetlik et al. |
| 7,021,186 B2 * | 4/2006 | Brazell et al. ................ 83/471.3 |
| 7,210,385 B2 * | 5/2007 | Stumpf et ..................... 83/471.3 |
| 7,337,702 B2 * | 3/2008 | Parks et al. ................... 83/471.3 |
| 7,367,254 B2 * | 5/2008 | Ushiwata et al. ............... 83/520 |
| 7,373,866 B2 * | 5/2008 | Ushiwata et al. ............... 83/520 |
| 7,383,759 B2 * | 6/2008 | Ushiwata et al. ............... 83/520 |
| 7,530,297 B2 * | 5/2009 | Carroll et al. ................ 83/471.3 |
| 7,549,360 B2 * | 6/2009 | Aoyama ....................... 83/471.3 |
| 7,669,510 B2 * | 3/2010 | Imamura et al. ............. 83/471.3 |
| 7,726,225 B2 * | 6/2010 | Imamura et al. ............. 83/471.3 |
| 7,854,187 B2 * | 12/2010 | Liu et al. ...................... 83/471.3 |
| 8,020,477 B2 * | 9/2011 | Aoyama ......................... 83/490 |
| 8,079,294 B2 * | 12/2011 | Shibata ........................ 83/471.3 |
| 2004/0134323 A1 * | 7/2004 | Wang ............................ 83/471.3 |
| 2005/0000338 A1 * | 1/2005 | Wascow ......................... 83/473 |
| 2005/0056131 A1 * | 3/2005 | Imamura et al. ............. 83/471.3 |
| 2005/0262983 A1 | 12/2005 | Hetcher et al. |
| 2007/0022853 A1 * | 2/2007 | Carroll et al. ..................... 83/34 |
| 2007/0163410 A1 * | 7/2007 | Stumpf et al. .................. 83/581 |
| 2008/0202303 A1 * | 8/2008 | Imamura et al. ............. 83/468.3 |
| 2008/0276784 A1 * | 11/2008 | Zhang ........................ 83/699.51 |
| 2009/0071308 A1 * | 3/2009 | Imamura et al. ............. 83/471.3 |
| 2009/0151529 A1 * | 6/2009 | Miura .......................... 83/471.3 |
| 2009/0173200 A1 * | 7/2009 | Aoyama et al. ............. 83/471.3 |
| 2010/0269655 A1 * | 10/2010 | Pierga et al. .................... 83/165 |

* cited by examiner

*Primary Examiner* — Sean Michalski
(74) *Attorney, Agent, or Firm* — Maginot, Moore & Beck

(57) ABSTRACT

A miter saw comprises a base and a bevel support pivotable with respect to the base. A cutting blade is supported by the bevel support and moveable between a plurality of cutting positions. The miter saw further comprises a bevel stop member moveably connected to the base between a plurality of stop positions. The plurality of stop positions include a first stop position where the bevel stop member is configured to stop the bevel support at a bevel angle of less than forty-five degrees. The plurality of stop positions also include a second stop position where the bevel stop member is configured to stop the bevel support at a bevel angle of about forty-five degrees. Furthermore, the plurality of stop positions include a third stop position where the bevel stop member is configured to allow the bevel support to pivot to a bevel angle of greater than forty-five degrees.

20 Claims, 20 Drawing Sheets

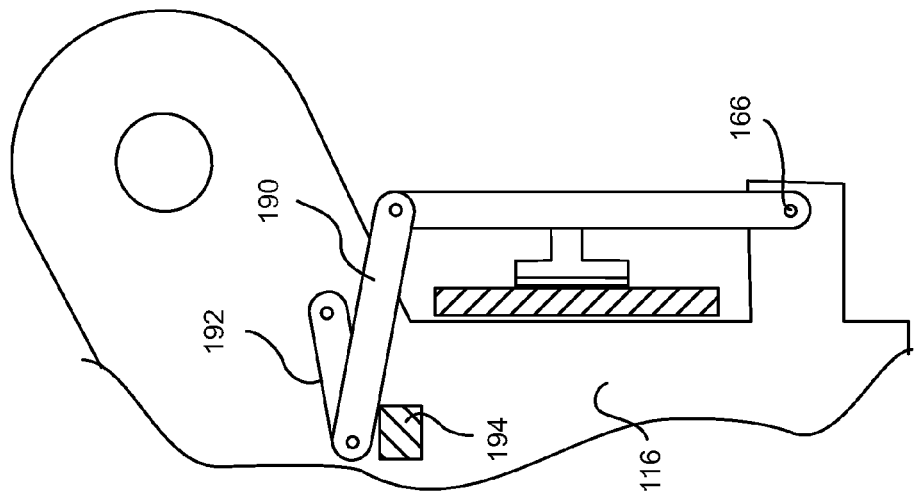
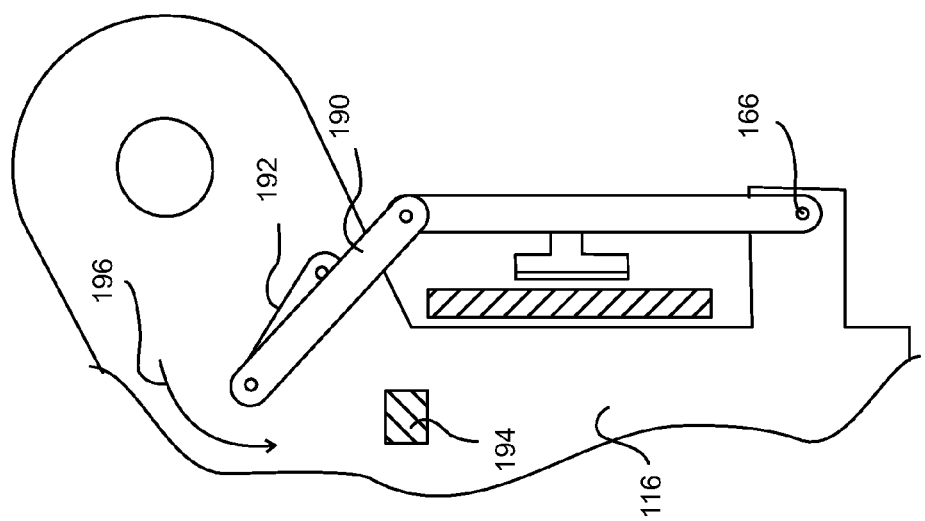
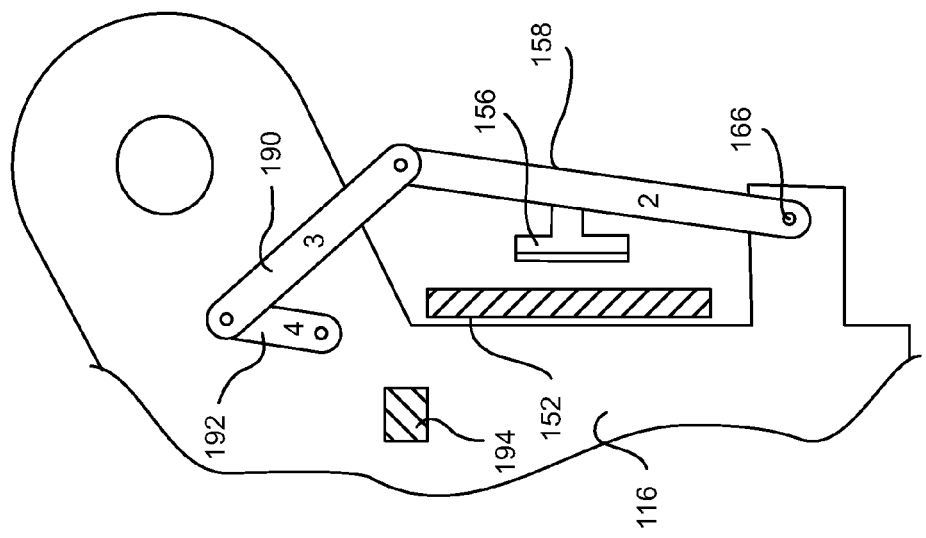

MITER SAW WITH BEVEL STOP TOGGLE

FIELD

This application relates to the field of power tools and more particularly to power saws, such as power miter saws.

BACKGROUND

Power miter saws are typically used for sawing material, for example, construction lumber. The miter saws include a base or platform on which a turntable is positioned. The turntable is used to support a work piece thereon. A support assembly of the miter saw is connected to the turntable and functions to support a cutting assembly that is operable to perform a cutting operation on the work piece. The support assembly includes functionality that enables the cutting assembly to move upward and away from the turntable and downward toward the turntable in order to produce a cut. The support assembly also typically includes functionality to enable the cutting assembly to pivot in relation to the turntable in order to produce angled cuts. An example of such a miter saw is disclosed in U.S. Pat. No. 6,769,338 issued to Svetlik et al.

The cutting assembly of the miter saw is relatively heavy because it includes a motor, a cutting blade, a blade guard, and other structural components such as those components used to maintain a precise path for the cutting blade. When the support assembly is pivoted to change the angle of the cut of the cutting assembly, the user must temporarily disengage a lock that prevents pivoting of the support assembly relative to the table. Once the lock is disengaged, the user pivots the support assembly and related cutting assembly to a desired cut angle and then reengages the lock to prevent further pivoting of the support assembly. This action of unlocking and re-locking the pivotable support assembly requires the release and engagement of relatively high forces that may be difficult for the user to manage. Accordingly, it would be desirable to provide a support assembly arrangement that makes pivoting of the support assembly and related cutting assembly easier for the user, including easier disengagement and reengagement of a pivot lock.

Many miter saws include a positive stop arrangement that prevents the support assembly and related cutting assembly from pivoting past a desired bevel position. These positive stop arrangements typically include a two-position toggle capable of stopping the support assembly at an angle commonly used for compound-angle cuts when cutting trim. The arrangement typically includes separate override arrangements which allow the support arrangement to pivot past the most common start and end positions in the event that extra angular capacity is needed. Because these positive stop arrangements include multiple components in multiple positions, it would be advantageous to simplify the positive stop arrangement into a single control, thereby reducing the cost of manufacturing and simplifying operation of the positive stop arrangement for the user of the miter saw.

It is desirable for miter saw designers to construct a miter saw as compact as possible. To this end, designers of miter saws attempt to make the width of the miter saw, measured side to side, as small as possible. This provides for ease of transport and storage, and reduces space utilized at a work site. However, users of miter saws often require a relatively wide support surface that will hold work pieces to be cut with the miter saw. Accordingly, some miter saws have been provided in the past with extendable work surfaces. However, many of these extendable work surfaces remain undesirably large for packaging, transport and storage. Accordingly, it would be desirable to provide a work support surface for a miter saw that is moveable between a retracted position that is relatively compact and an extended position that is relatively wide.

In addition to the foregoing, many miter saw arrangements include a laser alignment device. However, it is often difficult for the designer of the saw to find a location on the saw to mount an alignment system where the laser beam is directed to a desired location without physical obstruction during operation of the saw. Furthermore, certain mounting locations on the saw will cause the laser beam to shift out of an intended cutting line when the blade of the saw is not in a cutting position. Therefore, it would be desirable to provide a miter saw with a laser alignment guide that is mounted in a position that will not result in obstruction of the laser beam or movement of the laser beam out of the cut line. It would also be advantageous if such laser alignment arrangement could be easily adjusted to properly align the laser along the desired cut line. It would also be advantageous if the laser alignment arrangement could be easily and conveniently mounted and adjusted using an inexpensive mounting and adjustment system.

In view of the foregoing, it would be desirable to provide a miter saw with an improved bevel lock. It would also be desirable to provide a miter saw with an improved positive stop arrangement. Additionally, it would also be desirable to provide a miter saw with an improved extension support arrangement. Furthermore, it would be desirable to provide a miter saw with an improved laser alignment system. While it would be desirable to provide a miter saw that provides one or more of these or other features, the teachings disclosed herein extend to those embodiments which fall within the scope of the appended claims, regardless of whether they accomplish one or more of the above-mentioned advantages or include one or more of the above-mentioned features.

SUMMARY

A miter saw comprises a base and a bevel support pivotable with respect to the base between a plurality of bevel angles. A cutting blade is supported by the bevel support and moveable between a plurality of cutting positions. The miter saw further comprises a bevel stop member moveably connected to the base between a plurality of stop positions. The plurality of stop positions include a first stop position, a second stop position and a third stop position. The bevel stop member is configured to stop the bevel support at a bevel angle of less than forty-five degrees when in the first stop position. The bevel stop member is configured to stop the bevel support at a bevel angle of about forty-five degrees when in the second stop position. The bevel stop member is configured to allow the bevel support to pivot to a bevel angle of greater than forty-five degrees when in the third stop position. Accordingly, the bevel stop member comprises a plurality of bevel stop surfaces associated with the stop positions. Each of the plurality of bevel stop surfaces is configured to engage the bevel support, with each bevel stop surface positioned at a different height. Furthermore, each of the plurality of bevel stop surfaces may be inclined relative to the table and include indicia indicating the bevel angle associated with the bevel stop surface.

In at least one embodiment, the miter saw comprises a protrusion on the bevel support. The protrusion is configured to engage the first bevel stop surface when the bevel stop member is in the first stop position, and engage the second bevel stop surface when the bevel stop member is in the second stop position. The protrusion may comprise a stop bolt including a shaft threadedly engaging the bevel support and a head connected to the threaded shaft.

In at least one embodiment the miter saw further comprises a void formed in the bevel stop member. The void exposes the protrusion to a rotatable table positioned on the base when the bevel stop member is in the third stop position, thus allowing the bevel support to pivot to the bevel angle of greater than forty-five degrees until the protrusion contacts the table.

In at least one embodiment, the bevel stop member is pivotably connected to the table and a spring biases the bevel stop member toward the table. The bevel stop member may comprise a plurality of indentations configured to engage a detent arrangement connected to the table. Each of the indentations is associated with the first stop position, the second stop position or the third stop position of the bevel stop member. The detent arrangement may include a moveable ball retained within detent walls with the ball configured to engage one of the indentations in the bevel stop member in order to retain the bevel stop member in the first stop position, the second stop position or the third stop position.

The above described features and advantages, as well as others, will become more readily apparent to those of ordinary skill in the art by reference to the following detailed description and accompanying drawings. While it would be desirable to provide a miter saw arrangement that provides one or more of these or other advantageous features, the teachings disclosed herein extend to those embodiments which fall within the scope of the appended claims, regardless of whether they accomplish one or more of the above-mentioned advantages or include one or more of the above-mentioned features.

BRIEF DESCRIPTION OF THE DRAWINGS

FIG. 12A shows an alternative embodiment of an actuator for the clamp arm of FIG. 10 with the actuator in an unlocked position;

FIG. 12B shows the actuator of FIG. 12A moving toward a locked position;

FIG. 12 C shows the actuator of FIG. 12A in a locked position;

DESCRIPTION

Figure 1:
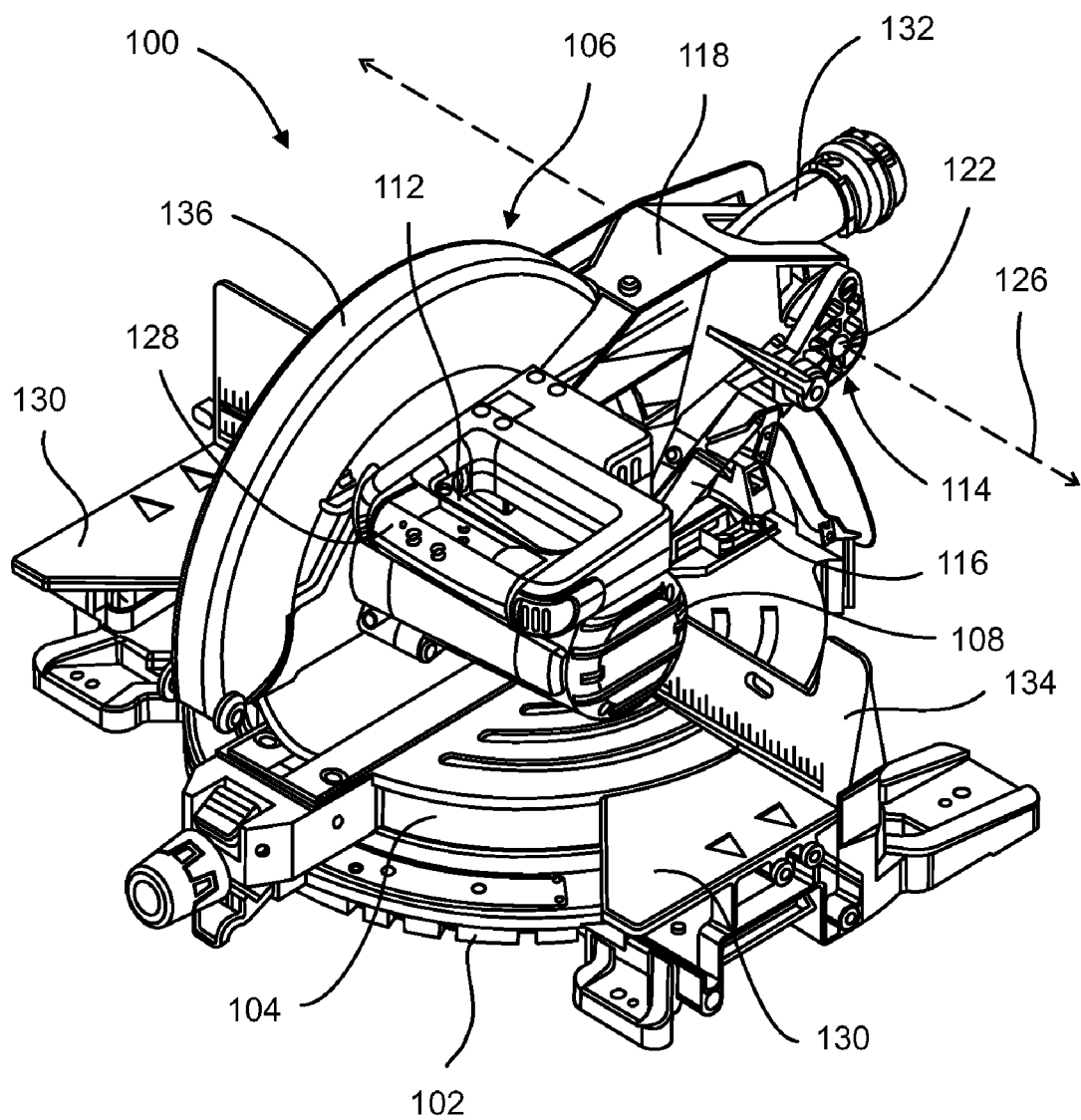
FIG. 1 shows a front perspective view of a miter saw assembly.
Figure 2:
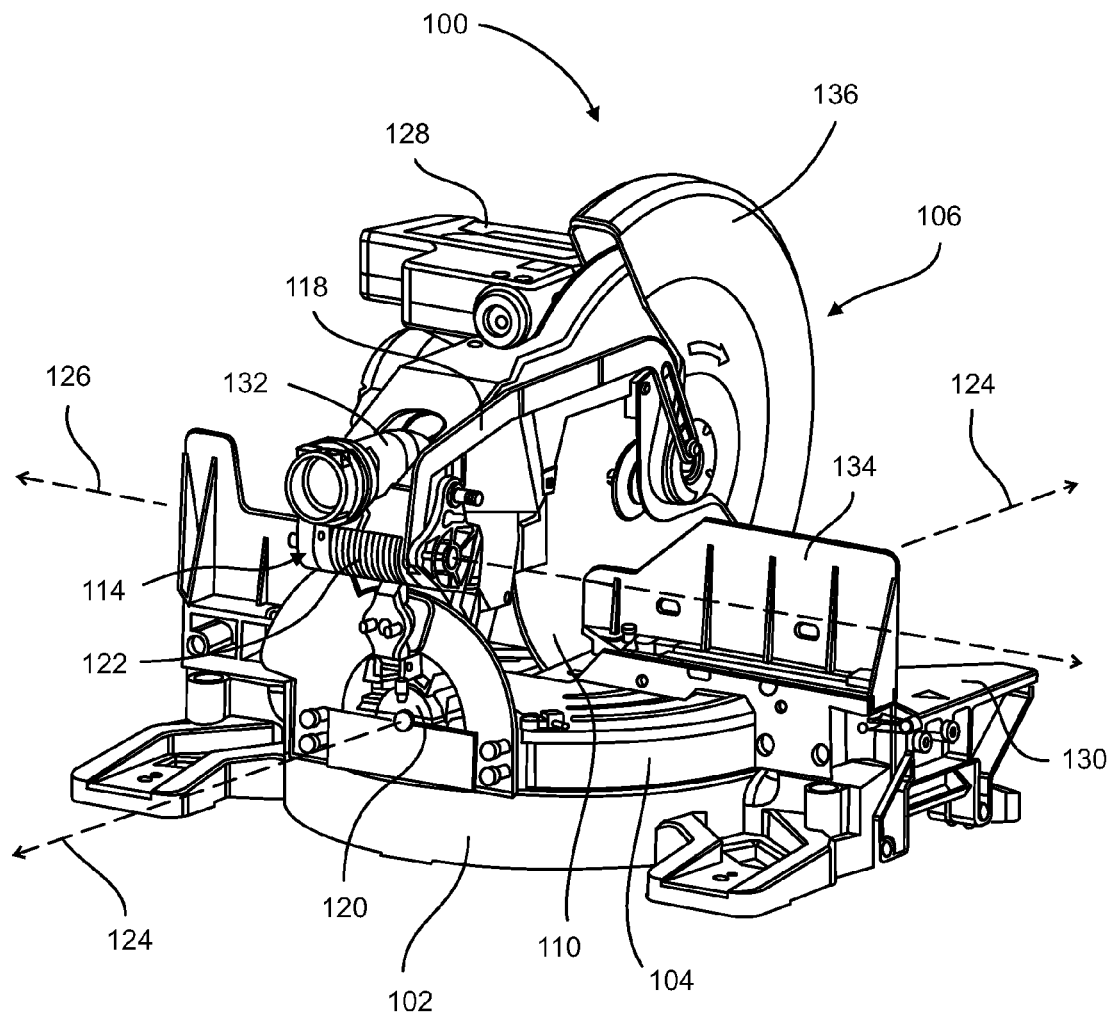
FIG. 2 shows a rear perspective view of the miter saw assembly of FIG. 1.
Figure 3:
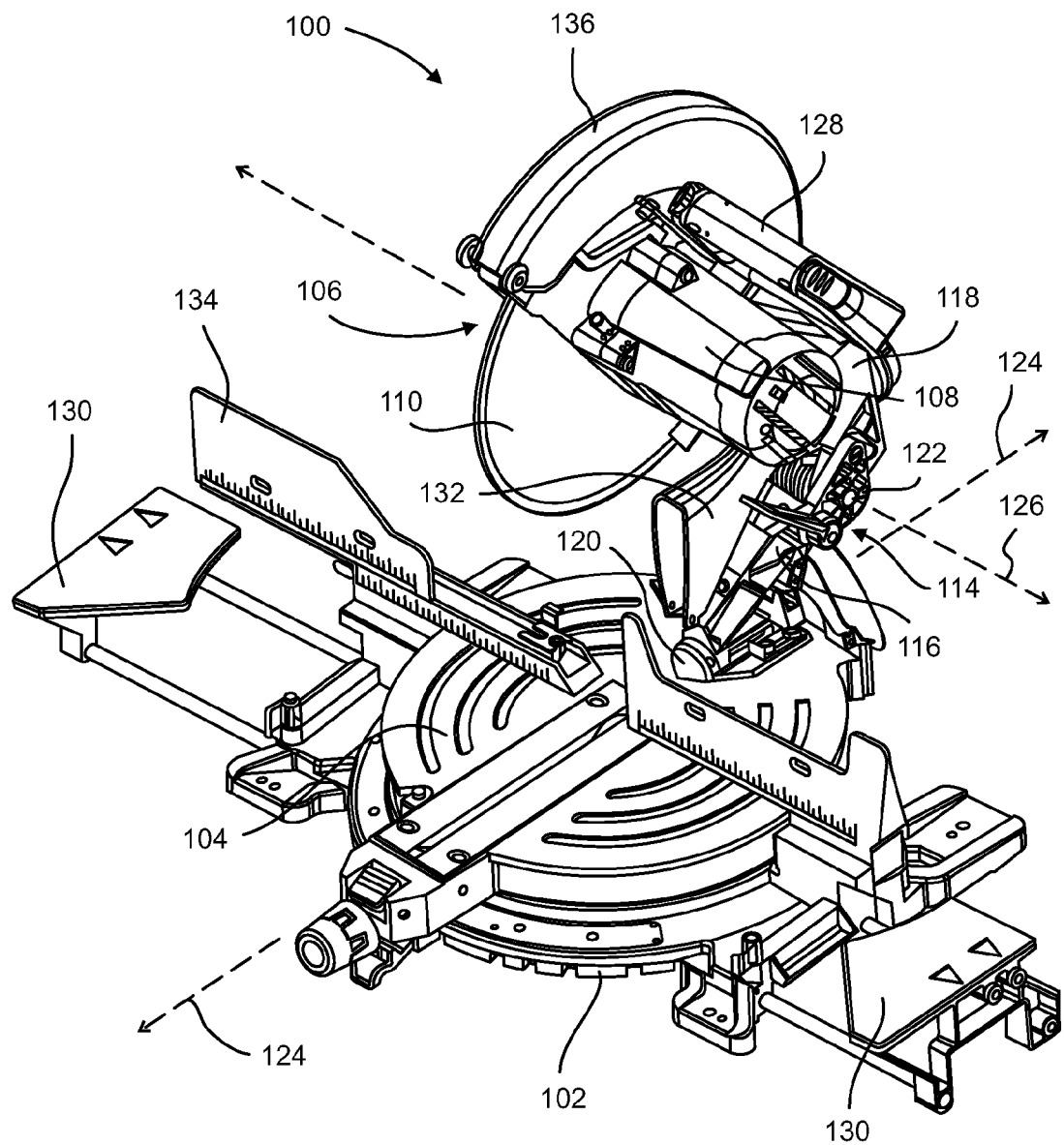
FIG. 3 shows a front perspective view of the miter saw assembly of FIG. 1 with a cutting arrangement pivoted away from a turntable.
Figure 4:
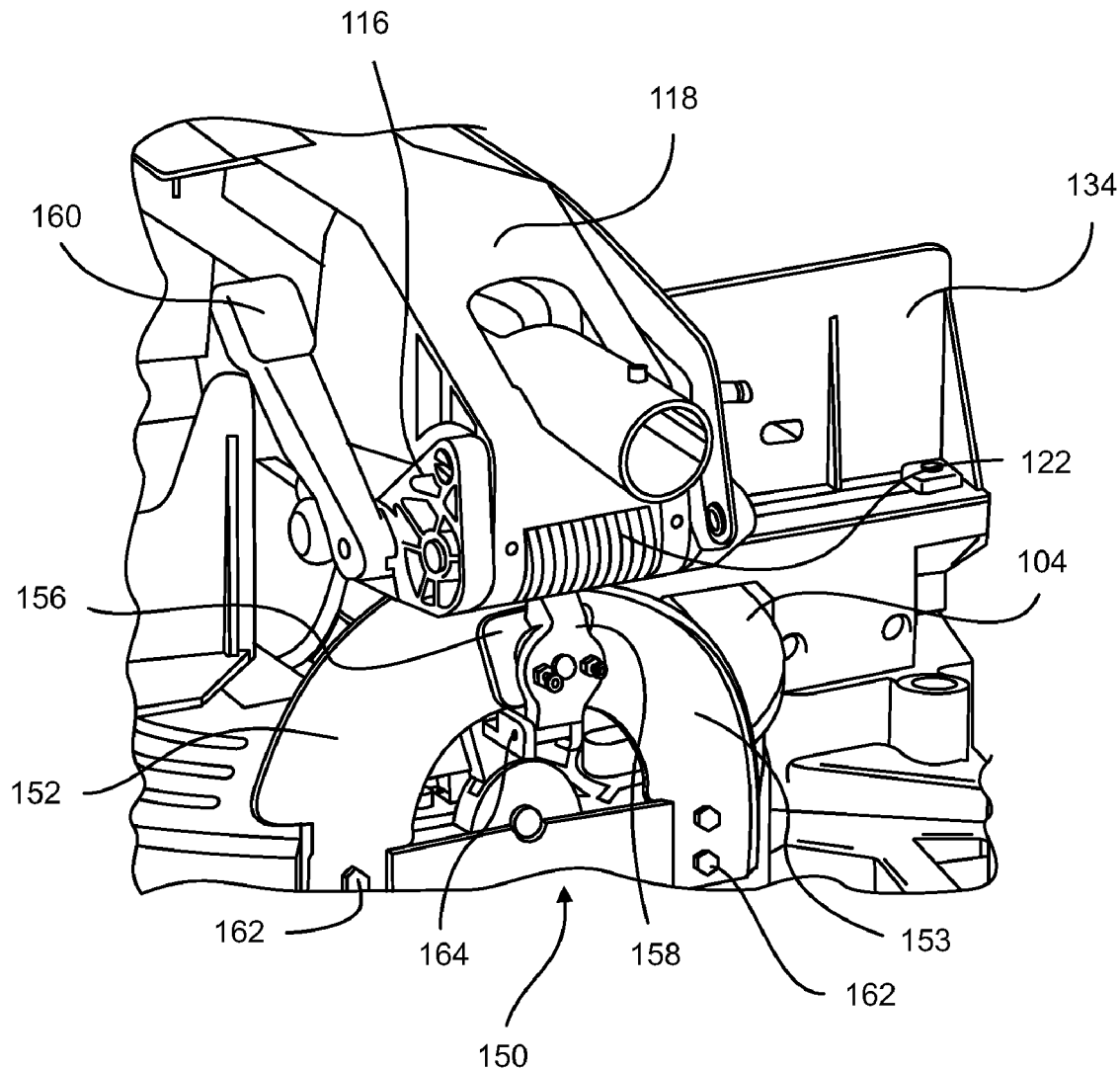
FIG. 4 shows a rear perspective view of a bevel lock arrangement of the miter saw assembly of FIG. 1.
Figure 5:
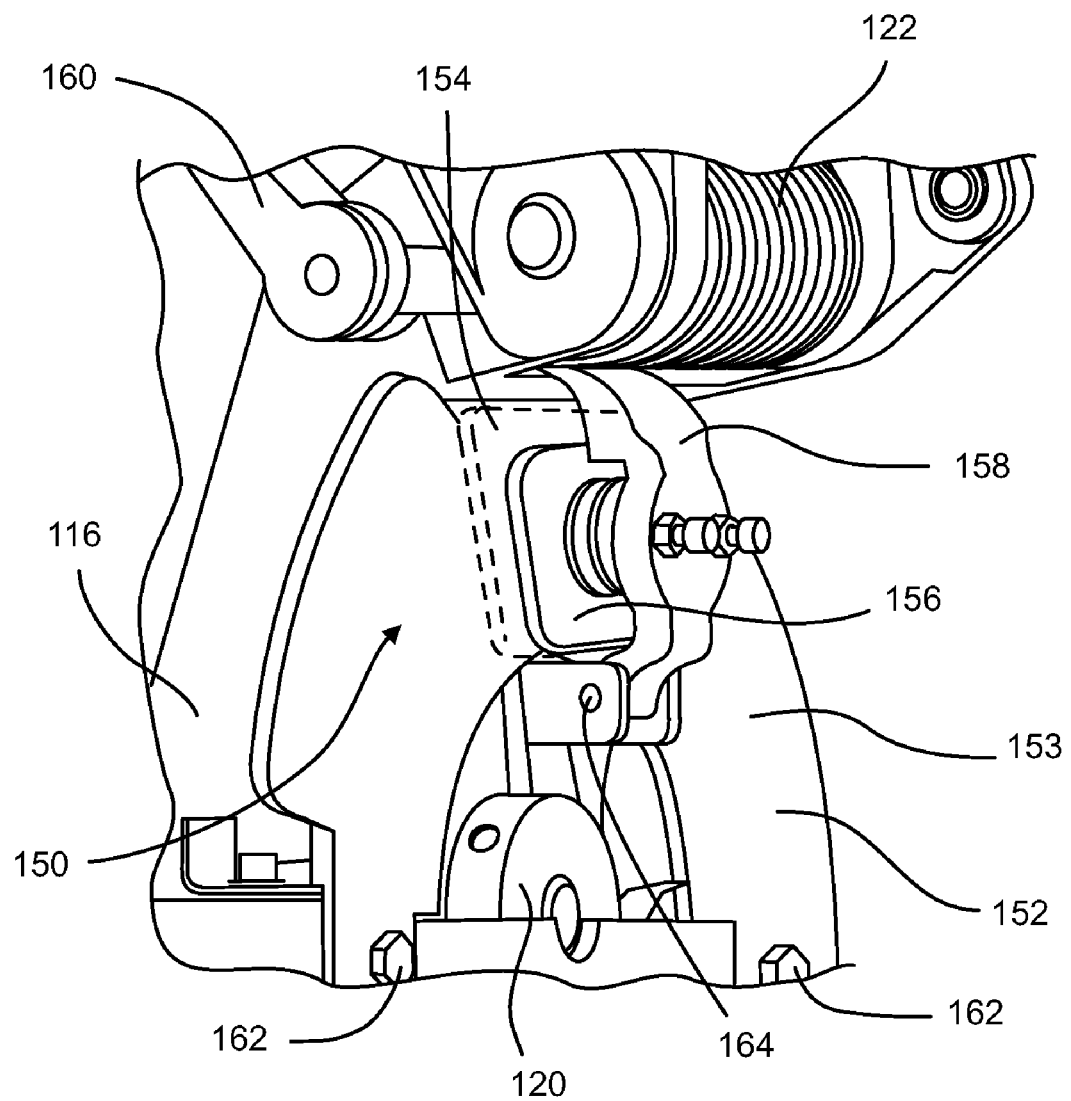
FIG. 5 shows a close-up view of the bevel lock arrangement of FIG. 4.
Figure 6:
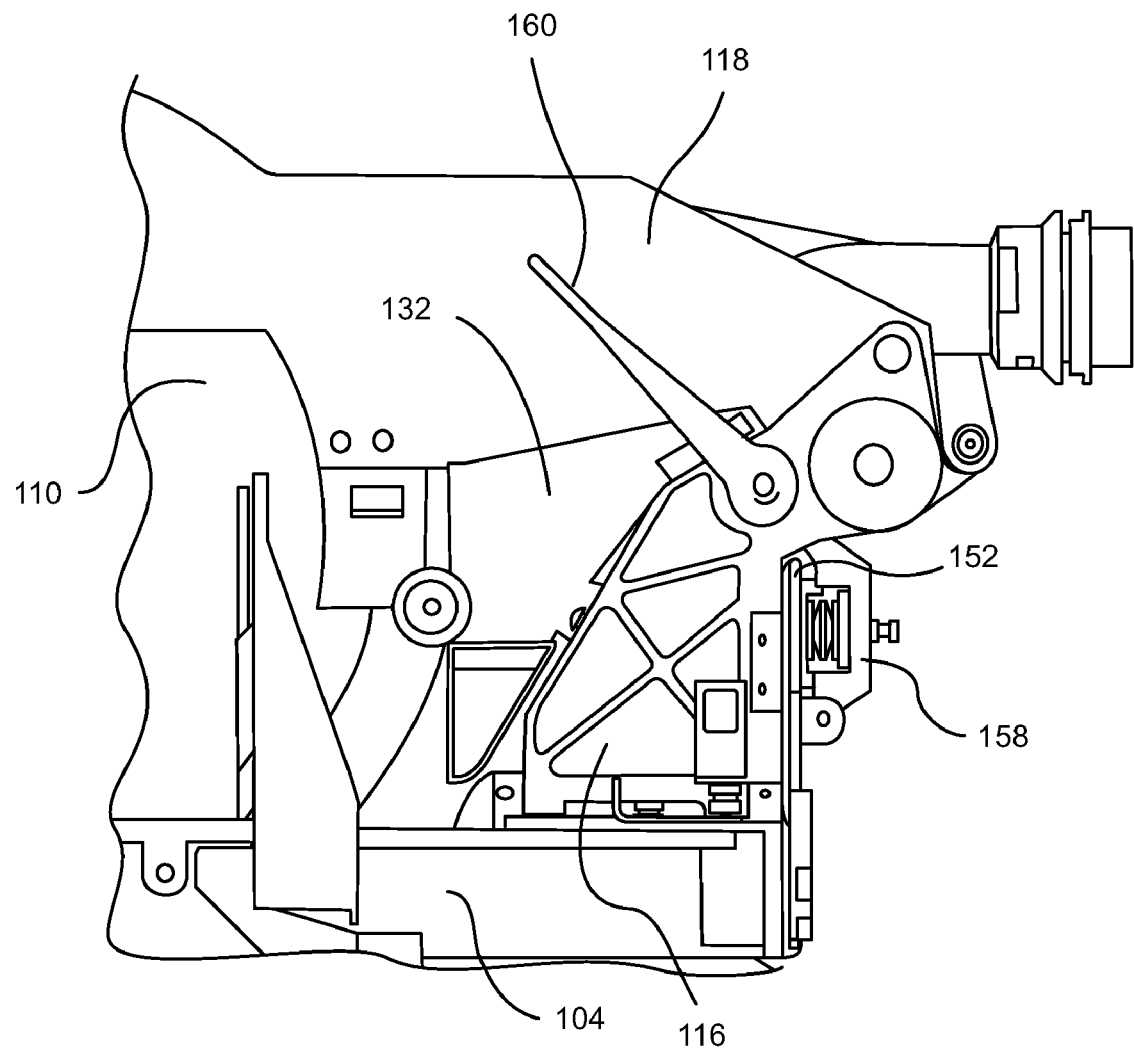
FIG. 6 shows a side view of the bevel lock arrangement of FIG. 4.

Referring now to FIGS. 1-3, there is shown a miter saw assembly 100. The miter saw assembly 100 includes a base 102 and a turntable 104 that is rotatable on the base 102. The miter saw assembly 100 further includes a cutting head 106 mounted on a cutting head support assembly 114. The cutting head 106 (which may also be referred to herein as a "cutting assembly") includes a motor 108 that is operable to rotate a circular saw blade 110. The cutting head support assembly 114 is attached to the turntable 104 and configured to support the cutting head 106 such that the cutting head may move over the turntable 104 and perform cutting operations.

The cutting head support assembly 114 includes a bevel arm 116, a cutting arm 118, a first pivot mechanism 120, and a second pivot mechanism 122. The bevel arm 116 (also referred to herein as a "bevel post") provides a bevel support structure for the miter saw assembly. The bevel arm 116 is pivotally attached to the turntable 104 by the first pivot mechanism 120. The first pivot mechanism 120 includes a hinge arrangement that enables the bevel post 120 of the support assembly 114 to pivot with respect to the turntable during a setup procedure. In particular, this arrangement is configured to enable the cutting assembly 106 to pivot about axis 124 from a vertical position (as shown in FIGS. 1-3) to an angle of 45° (not shown) or more in the leftward direction prior to a cutting operation. This pivoting allows the blade 110 of the cutting assembly 106 to approach the table 104 from a bevel angle and perform angled cuts, as is well known in the art.

The cutting arm 118 of the support assembly 114 provides a support for the cutting assembly 106. The cutting arm 118 is pivotably connected to the bevel arm 116 via the pivot mechanism 122. The pivot mechanism 122 enables pivoting movement of the cutting assembly 106 in relation to the turntable 104 and the base 102 during a cutting operation. In particular, the second pivot mechanism 122 includes a hinge that enables the cutting arm 118 to pivot with respect to the bevel arm 116 about an axis 126. This pivoting allows the blade 110 of the cutting assembly 106 to move toward and away from a horizontal turntable 104 to perform a cutting operation, as is well known in the art.

The cutting assembly 106 includes a handle 128 connected to the cutting arm 118 to facilitate movement of the cutting assembly 106 in relation to the turntable 104. The handle 128 is designed and dimensioned to be grasped by a human hand when performing a cutting operation. This allows the user to easily pivot the cutting assembly 106 about axis 126. A switch 112 is provided on the handle 128 to allow the user to easily energize and de-energize the electric motor 108 during a cutting operation. A blade guard 136 covers the top portion of the circular saw blade 110.

The circular saw blade 110 includes a generally circular plate having a central opening defined therein. A plurality of cutting teeth are attached to periphery of the plate, as is well known in the art. A dust chute 132 (which may also be referred to herein as a "dust conduit") is secured to the bevel post 116 such that pivots with the bevel post relative to the turntable 104. As shown in FIGS. 1 and 2, the dust chute 132 is positioned behind the blade 110 when the blade is in a downward cutting position. In this manner, the dust chute 132 receives sawdust and other debris created by the blade 110 when performing a cutting operation.

The circular saw blade 110 is used to cut a work piece (not shown) positioned on or over the base 102. Accordingly, the base includes a work surface configured to support the work piece. The work surface includes the rotatable turntable 104 as well as laterally moveable work surface extensions 130 (which may also be referred to herein as "support extensions"). As shown in FIG. 3, and as explained in further detail below, the support extensions 130 are moveable to an extended position in order to better support a work piece on the miter saw. A rip fence 134 is secured to the base 102 and positioned over the turntable 104 for aligning a work piece thereon, as is known in the art. In addition to the above description, various additional features and assemblies are provided of the miter saw assembly 100 to assist the user in controlling the miter saw and obtaining a desired cut on the work piece, as explained in further detail below.

Bevel Lock

With reference now to FIGS. 4-8, a bevel lock arrangement 150 for the miter saw assembly 100 is shown. The bevel lock arrangement 150 includes a rotor 152, a forward brake pad 154, a rearward brake pad 156, a clamp member 158, and a pivotable handle 160. The handle 160 is configured to move the clamp member 158 between a lock position and an unlock position. When in the lock position, the clamp member 158 forces the forward brake pad 154 into tight engagement with the rotor, trapping the rotor between the forward brake pad 154 and the rearward brake pad 156 and locking the bevel arm 116 in place.

The rotor 152 provides a locking plate for the bevel lock arrangement 150. The rotor 152 is an arcuate member that is fixed to the turntable with bolts 162. The rotor 152 is substantially rigid and may be comprised of a metal material or a plastic material. In at least one embodiment, the rotor 152 is an arcuate plate structure that provides two opposing substantially flat locking surfaces 153 (i.e., a first locking surface on one side of the arcuate plate and a second locking surface on the opposite side of the arcuate plate). While the disclosed embodiment shows that the locking surfaces 153 are generally planar and flat, in other embodiments the locking surfaces on the rotor 152 may not be planar and flat in shape, and may instead be conical in shape or take on any of numerous other shapes. The locking surfaces 153 are designed to engage the brake pads 154, 156. The rotor 152 and its locking surfaces 153 are oriented substantially perpendicular to the work piece support surface 105 provided by the table 104. The arcuate shape of the rotor 152 allows the brake pads 152, 154 to follow the locking surfaces 153 as the bevel post 116 is rotated.

The brake pads 154, 156 provide high friction surfaces that engage the rotor 152 and are complimentary in shape to the locking surfaces 153 of the rotor. Accordingly, in the disclosed embodiment, the high friction surfaces are substantially flat. However, if the locking surfaces 153 are differently shaped, the brake pads may be configured with a complimentary shape to provide greater surface area contact between the rotor 152 and the brake pads 154, 156. In at least one embodiment, the high friction surfaces of the brake pads 154, 156 are comprised of a semi-metallic ceramic composite material, similar the material used for automotive brake pads. In another alternative embodiment, the high friction surfaces of the brake pads 154, 156 may be comprised of a natural or synthetic rubber or other elastomer material. Alternatively, the brake pad surfaces may be comprised of a felt or other fabric. Preferably, the brake pads 154, 156 are comprised of a material that does not easily slide on the surface of the rotor 152. In the disclosed embodiment, the brake pads 154, 156 are singular on each side of the rotor 152 generally rectangular or trapezoidal in shape. In other embodiments the brake pads 154, 156 may be provided in other shapes (e.g., circular, etc.) or may comprise a plurality of pads on each side of the rotor 152. The high friction surfaces may be secured on the brake pads 154, 156 by any of various processes or may be integrally formed on the brake pads. In the disclosed embodiment, the high friction surfaces are heat pressed onto a metal substrate which includes locating/mounting features for the brake pads 154, 156.

Figure 10:
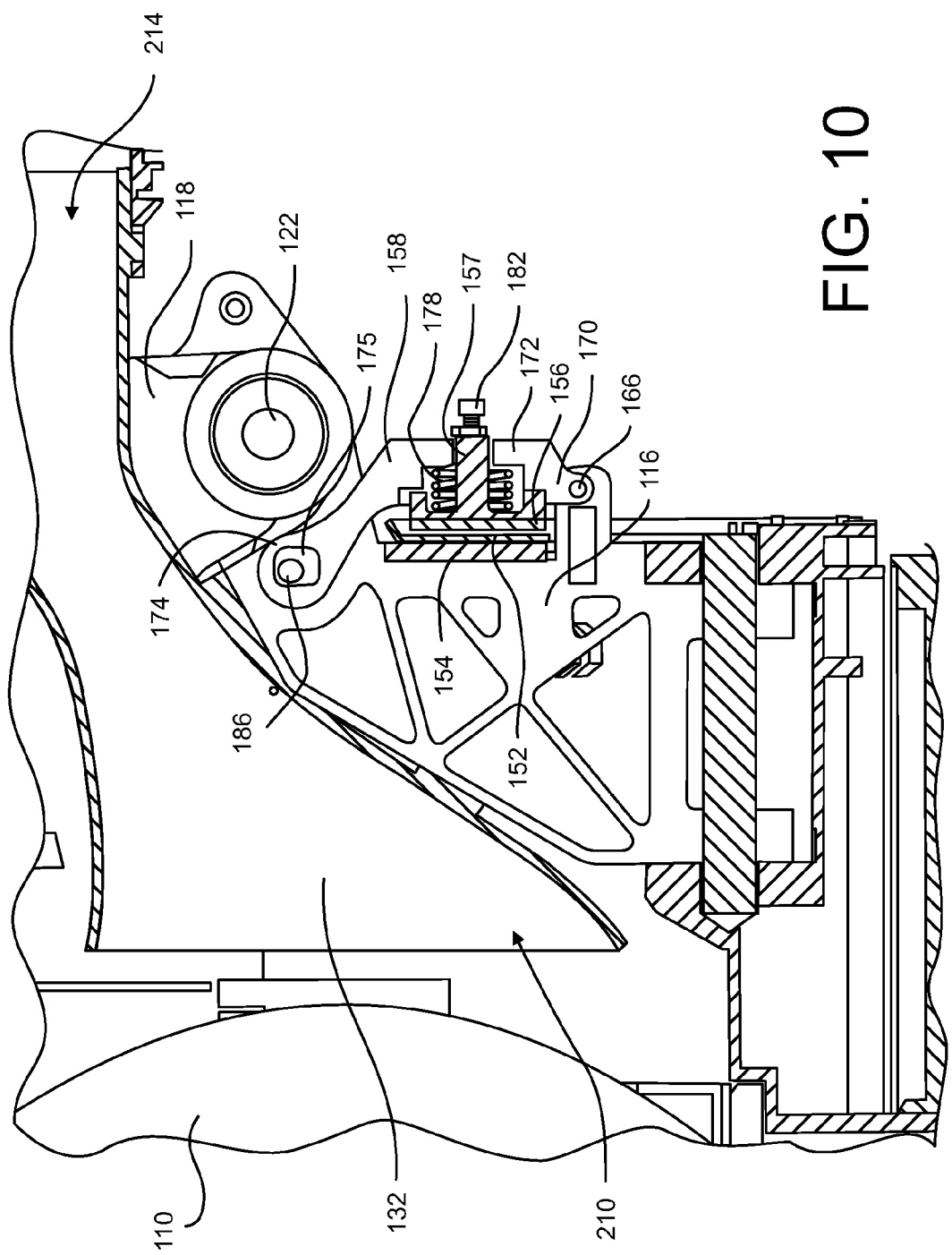
FIG. 10 shows a cross-sectional view of the bevel lock arrangement of FIG. 9A showing a cam engaging the clamp arm.

The forward brake pad 154 is fixed to the bevel post 116 and is configured to engage the substantially flat forward surface of the rotor 152. The rearward brake pad 156 is retained by the clamp member 158 and is configured to engage the substantially flat rearward surface 153 of the rotor 152. The rearward brake pad 156 includes a center post 157 or other mounting structure that is attached to the high friction surface and helps retain the brake pad 156 on the clamp member 158. As shown in FIG. 10, the center post 157 extends away from the high friction surface that engages the rotor 152 and into a hole in the clamp member 158.

Figure 7:
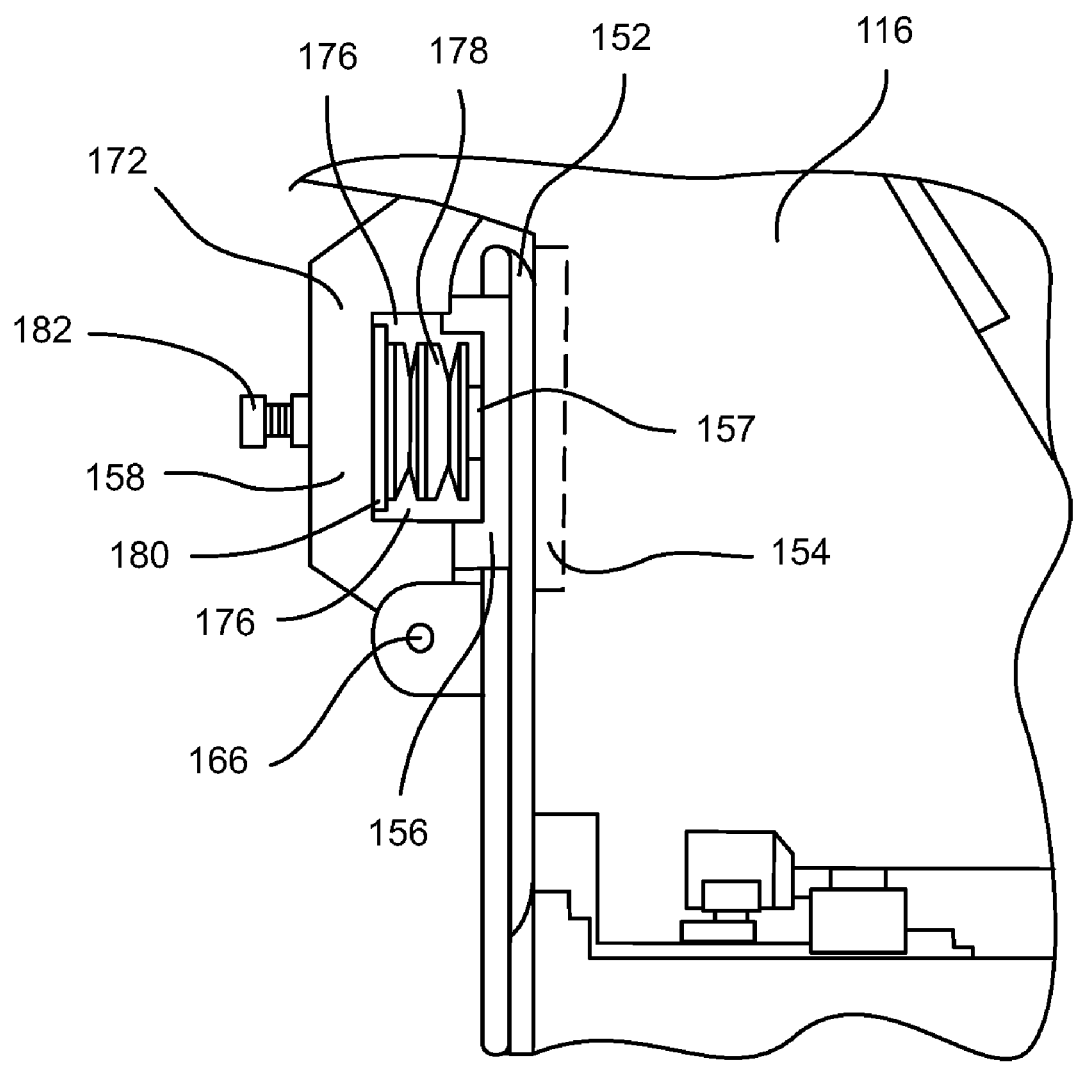
FIG. 7 shows a close-up view of the bevel lock arrangement from an opposite side of the bevel post from that shown in FIG. 6.
Figure 8:
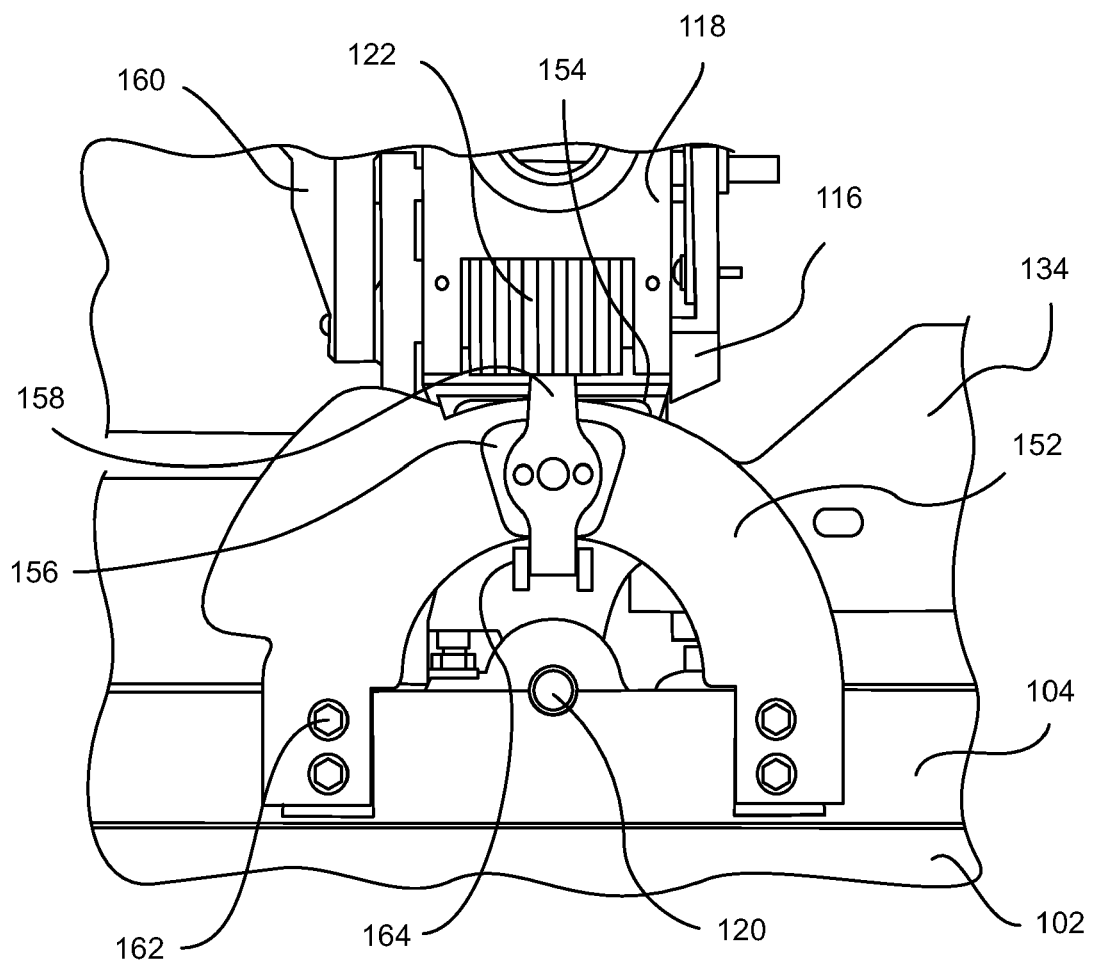
FIG. 8 shows a rear view of the bevel lock arrangement of FIG. 4.
Figure 9A:
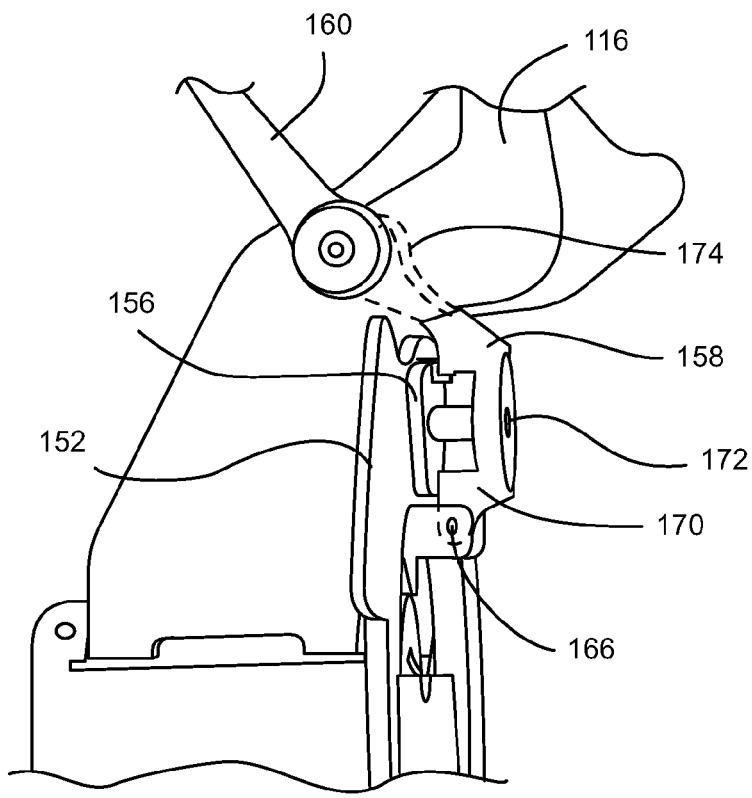
FIG. 9A shows a side perspective view of the bevel lock arrangement of FIG. 4 showing the clamp arm extending into an opening in the bevel post.
Figure 9B:
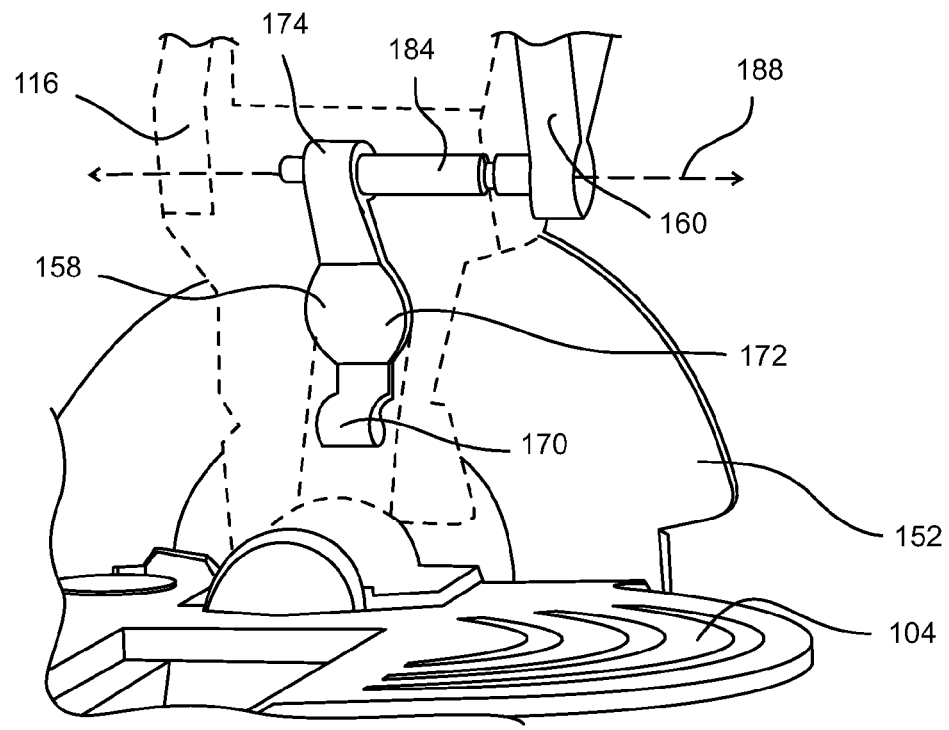
FIG. 9B shows a front perspective view of the bevel lock arrangement of FIG. 9A with the bevel post shown in phantom to expose the connection between the lever and the clamp arm.

The clamp member 158 is pivotably connected to the bevel arm 116 at a hinge structure 164 using a pivot pin 166 (see FIG. 7). The entire clamp member 158 is best seen in FIGS. 9 and 10 and includes a pivot end 170, clamp portion 172, and an actuator arm 174. The pivot end 170 of the clamp member 158 includes a channel that receives the pivot pin 166 of the hinge structure 164, allowing the clamp member 158 to pivot with respect to the bevel arm 116.

As mentioned above, the clamp portion 172 of the clamp member 158 is configured to retain the brake pad 156, with the brake pad 156 moveable relative to the clamp member 158. As best seen in FIGS. 7 and 10, the brake pad 156 is retained by the center post 157 that extends through a center hole in the clamp member 158. When the brake pad 156 moves relative to the clamp member 158 this post 157 moves within the hole of the clamp member 158.

A recess 176 is formed between the brake pad 156 and the clamp portion 172. A spring stack 178 and a leveling plate 180 are positioned in the recess 176 and rest upon the center post 157 extending from the brake pad 156. Because of its position between the brake pad 156 and the clamp member 158, the spring stack 178 biases the brake pad 156 away from the clamp member 158 and toward the rotor 152. Even though the brake pad 156 is retained by the clamp member 158, the brake pad 156 is moveable relative to the clamp member 158, and the spring stack 178 is compressed and decompressed as the brake pad 156 moves toward and away from the clamp member 158. An adjustment screw 182 may be used to connect the spring stack 178 to the clamp portion 172 of the clamp member 158. The adjustment screw 182 may be tightened or loosened to adjust the position of the spring stack 178 relative to the clamp member 158. If the spring stack 178 is moved further away from the clamp portion 172 by the adjustment screw, more force is required to lock the clamp member 158 since more spring 178 compression is required when the clamp member 158 forces the brake pad 156 against the rotor 152. However, if the spring stack 178 is allowed to move closer into the clamp portion 172 by the adjustment screw, less force is required to lock the clamp member 158 since less spring 178 compression is required when the clamp member 158 forces the brake pad 156 against the rotor 152.

With particular reference now to FIGS. 9-11B, the actuator end 174 of the clamp member 158 is provided as an arm that extends away from the clamp portion 172. The actuator end 174 of the clamp member 158 includes a channel 175 that receives a shaft 184. The shaft 184 is secured to the bevel post 116 and is rotatable about axis 188. One end of the shaft 184 rotatably engages the channel 175 of the clamp member 158 and an opposite end of the shaft 184 is fixed to the handle 160.

As shown in FIG. 10, an eccentric arrangement in the form of a cam 186 is provided on a portion of the shaft 184 that is positioned within the channel 175. The shaft 184 is allowed to rotate about the axis 188, but is otherwise held stationary relative to the bevel post 116. When the shaft 184 rotates, the cam 186 engages the interior wall of the channel 175, causing the position of the clamp member 158 to shift between a clamping position and a loosened position.

Figure 11A:
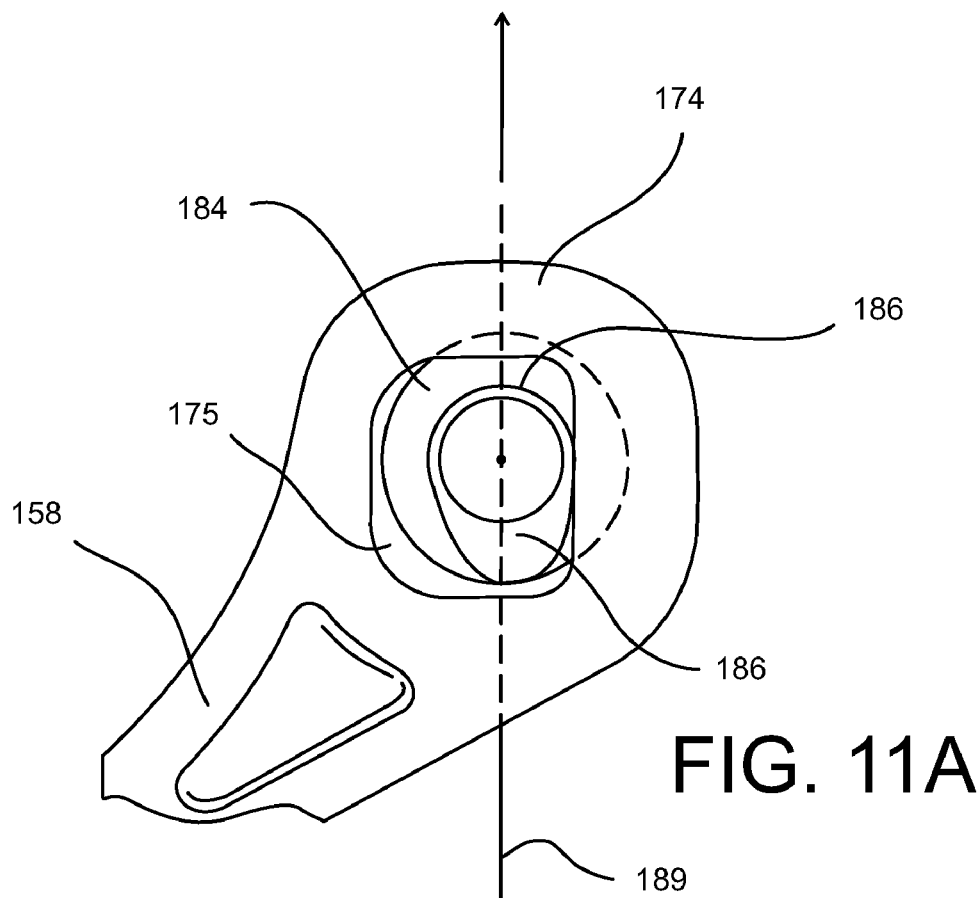
FIG. 11A shows a cross-sectional view of an alternative embodiment of a cam member engaging the clamp arm of FIG. 10 from a reverse side.
Figure 11B:
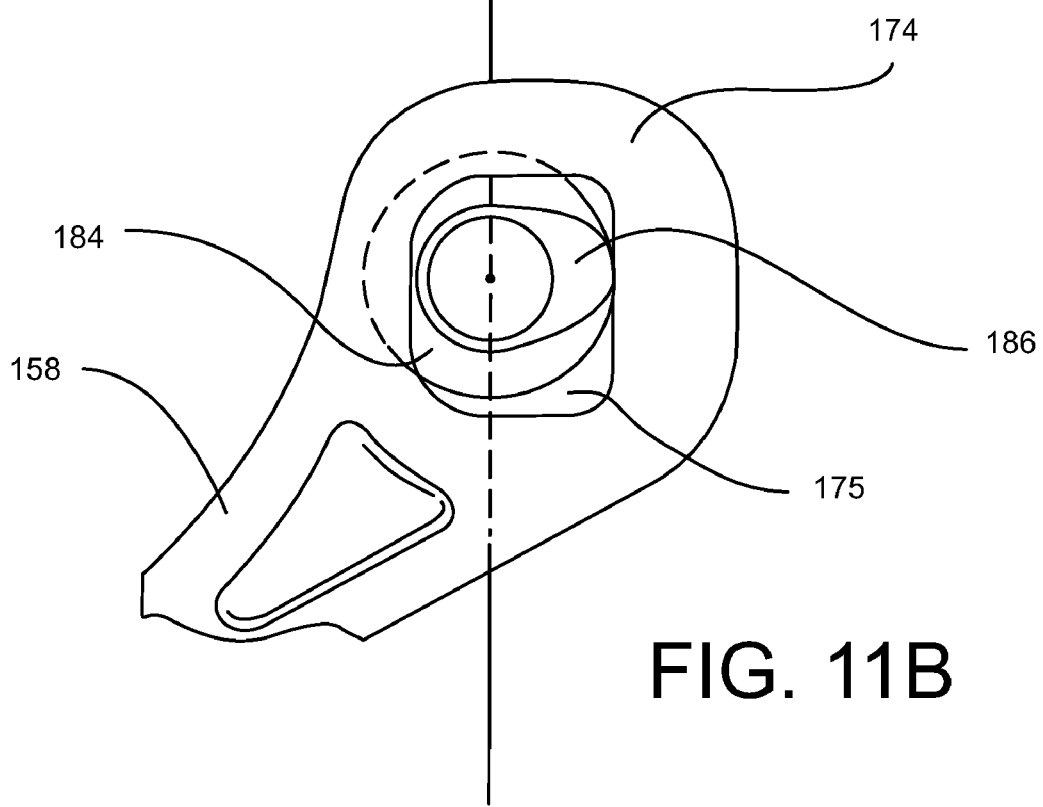
FIG. 11B shows a the cam member of FIG. 11A rotated resulting in movement of the clamp arm.
Figure 13:
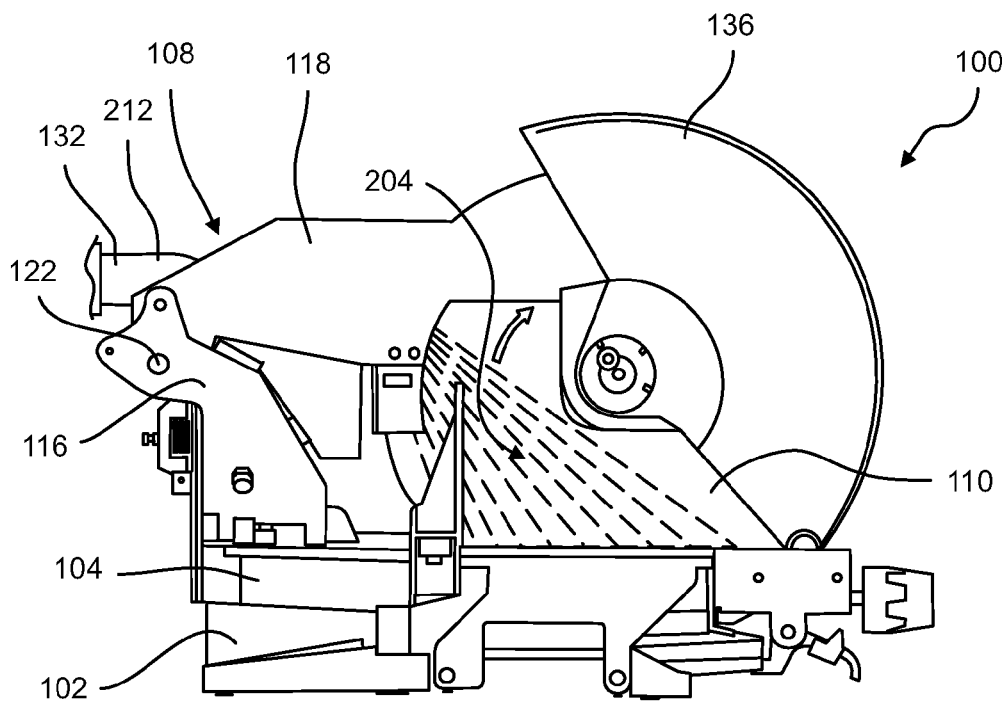
FIG. 13 shows a side view of the miter saw of FIG. 1 showing the beam path of a laser alignment device passing alongside the blade of the cutting arrangement.
Figure 14:
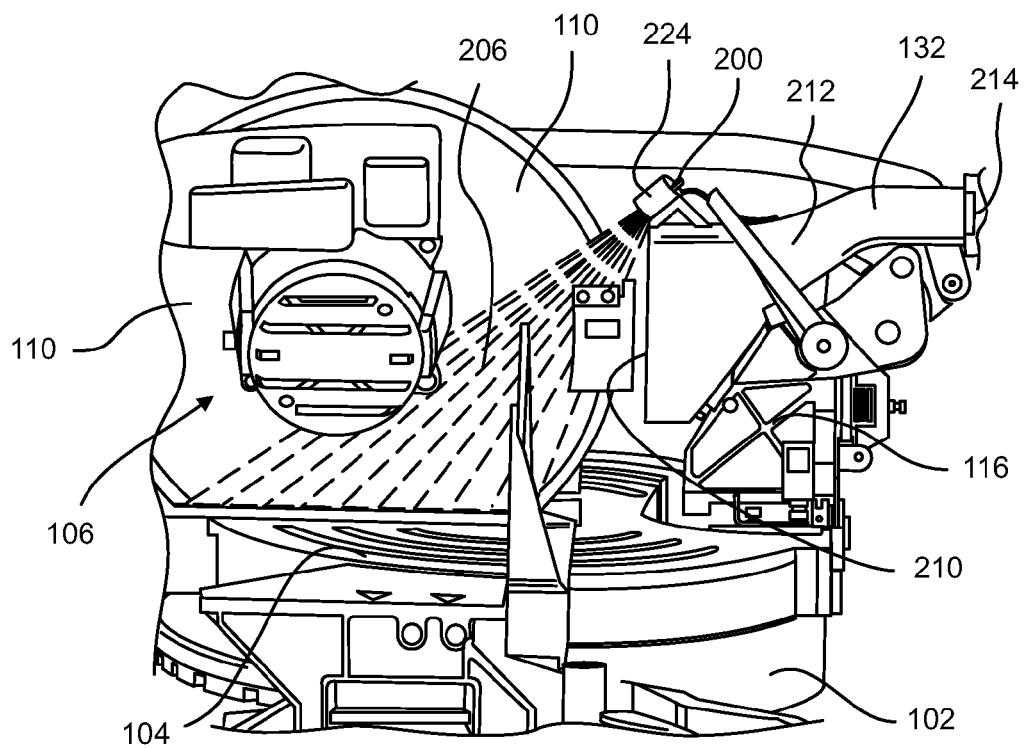
FIG. 14 shows a reverse side perspective view of the miter saw of FIG. 13 with the cutting arm and blade guard removed from the figure to show placement of the laser alignment device on a dust chute.

FIGS. 11A and 11B show a close-up view of the cam 186 and clamping arm 158 arrangement shown in FIG. 10. As mentioned above, the cam 186 is positioned on the shaft 184 that is connected to the handle 160. The clamping arm 158 is configured to pivot between the position shown in FIG. 11A and the position shown in FIG. 11B (compare position of clamp member 158 to line 189 extending through each axis 188 in FIGS. 11A and 11B). The handle 160 acts as an actuator in the form of a lever. Movement of the lever 160 results in rotation of the shaft 184, thereby causing the clamp member 158 to pivot between a clamping position and a free position.

In operation, a user may set up the miter saw arrangement 100 starting with the handle 160 in an unlocked position. With the handle in the unlocked position, the bevel post 116 is free to pivot relative to the table 104. After moving the cutting arrangement to a desired bevel position, the user then locks the bevel post 116 in the desired position by rotating the handle 160 to a locked position. When the handle 160 is rotated, the cam 186 engages the clamp member 158, causing the clamp member 158 to pivot about pin 166 on the bevel post and toward the rotor 152. When the clamp member 158 pivots toward the rotor 152, the rearward brake pad 156 is forced against the rotor 152 by the clamp member 158 and connected spring stack 178. The force of the brake pad 156 against the surface 153 of the rotor 152 also causes the rotor 152 to be forced against the forward brake pad 154 which is secured to the bevel post 116. Thus, the brake pads 154 and 156 clamp down on the rotor 152 and lock the bevel post 116 in place at the desired bevel angle.

While the foregoing is but one embodiment of the bevel lock arrangement, it will be appreciated that other embodiments are also possible. For example, FIGS. 12A-12C show an alternative embodiment where the actuator and clamp member 158 are provided as part of a four bar linkage arrangement. FIG. 12A shows a schematic representation of such a four bar linkage arrangement with the various bars of the linkage labeled. The first bar (not labeled) is provided by the bevel post and is a stationary linkage. The second bar is the clamping member 158 with the brake pad 156 attached to the clamping member 158. The second bar 158 is pivotable about pivot pin 166 of the hinge arrangement 164. The third bar 190 is pivotably connected to the second bar 158. The fourth bar 192 is pivotably connected to the third bar 190 and the bevel post 116. The handle (not shown) may be connected to the third bar 190 or the fourth bar 192. A lock stop 194 is connected to the bevel post 116 and limits movement of the four bar linkage once the linkage is in a locked position.

In order to move the linkage from the unlocked position of FIG. 12A to the locked position of FIG. 12C, a user grasps the handle which serves as a lever for the four bar linkage. The user then moves the handle such that the third 190 and fourth 192 bars of the linkage move in the direction indicated by arrow 196 until the linkage contacts the lock stop 194. With the linkage in this position shown in FIG. 12C, the brake pad 156 is in contact with the rotor 152, and the bevel post 116 is locked in place on the miter saw.

In at least one alternative embodiment, the clamp member 158 itself may provide the clamping surface that engages the rotor 152. In this embodiment, the clamping surface may be a high friction surface provided on the clamp member 158. Alternatively, the rotor 152 could provide the high friction surface and the clamp member may simply provide a metallic surface that is forced against the rotor. Accordingly, it will be apparent that although various embodiments of the bevel post lock are disclosed herein, numerous other embodiments are possible, and the scope of any appended claims should not be limited to the disclosed embodiments.

Laser Alignment Device on Dust Chute

With reference now to FIGS. 13-17, the miter saw assembly 100 includes a laser alignment device 200 positioned on the dust chute 132. The laser alignment device 220 comprises a cartridge 202 that houses optics and a laser generator. The laser generator may be any of various laser generators known in the art. The laser generator is configured to emit at least one narrow beam of light 204, 206 (shown in dotted lines in FIGS. 13-17) toward the table 104 to indicate a cut to be made with the miter saw assembly 100. The laser generator may be, for example, laser LEDs that emit a narrow beam of light which is directed at an angle of approximately 30-80 degrees relative to the table. Although laser LEDs are one embodiment of the light source providing the alignment feature, it should be understood that other light sources and arrangements can be used. For example, regular LED's or incandescent light sources may be used in conjunction with lenses or a slotted mask. Furthermore, while the disclosed embodiment includes beams of light 204, 206 shining along opposite sides of the blade 110 which enable an observer to determine a cut position between the laser beams 204, 206, it should be understood that such a cut position can also be determined with a light beam shining on only one side of the blade 110.

The dust chute 132 is adjustably positioned on the bevel arm 116 of the support assembly 114. As discussed previously, the support assembly 114 also holds the cutting head 106 such that the cutting head 106 is pivotable with respect to the bevel arm 116. Although the embodiments of FIGS. 13-17 show the dust chute 132 positioned on the bevel arm 116 of the cutting support assembly 114, it will be recognized that in other embodiments the dust chute 132 may be positioned on other portions of the support assembly 114, such as the cutting arm 118.

With continued reference to FIGS. 13-17, the dust chute 132 includes an input port 210, an exit port 214, and a funnel body 212 positioned between the input port 210 and the exit port 214. The input port is positioned directly behind the circular blade 110 and is open to the blade 110 such that saw dust and other debris sprayed from the blade 110 during cutting will be propelled through the input port 210 and into the dust chute 132. The dust chute 132 is generally comprised of a molded plastic material and is molded from two halves (i.e., split vertically down the center) and vibration welded together. It will be recognized that the dust chute 132 may also be formed from other materials, such as metal.

The funnel body 212 of the dust chute 132 includes walls that extend through an opening 208 formed between the bevel arm 116 and the cutting arm 118. In particular, the funnel body 212 passes over the pivot mechanism 122 on the bevel arm 116. The cutting arm 118 is attached to the pivot mechanism 122, but is positioned to the outside of the funnel body 212 of the dust chute 132, thus allowing the cutting arm 118 to pivot without interference from the dust chute 132.

The funnel body 212 of the dust chute 132 has a larger diameter near the input port 210 than the exit port 214. Although the lateral diameter of the dust chute 132 is substantially uniform from front to back, the vertical diameter gradually tapers down when moving from the input port 210 to the exit port 214. Accordingly, the cross-sectional shape of the dust chute 132 near the input port 210 is elongated and substantially rectangular while the cross-sectional shape of the dust chute 132 near the exit port 214 is substantially circular. This larger opening at the input port 210 allows the dust chute 132 to effectively collect dust and debris over a relatively large spray area from the cutting blade and channel the dust to a smaller area at the exit port 214. The exit port 212 is configured to releasably connect to a dust collection bag (not shown). Alternatively, the miter saw assembly may include a vacuum system (not shown) having an input line that is connected in fluid communication with the exit port 212 of the dust chute 132.

Figure 15:
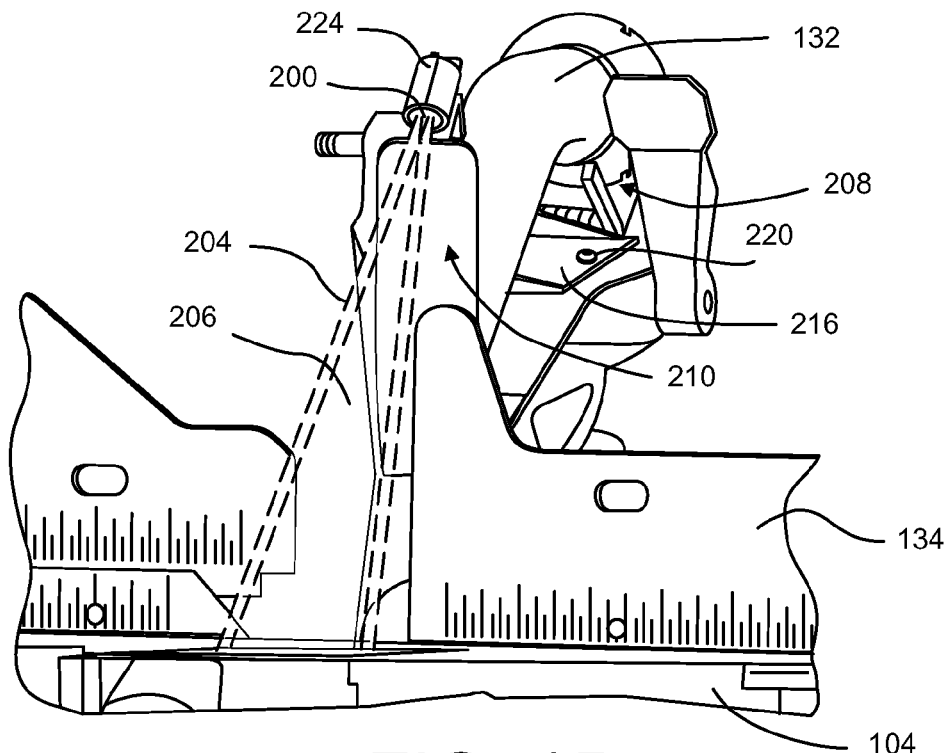
FIG. 15 shows a front perspective view of the laser alignment device of FIG. 14.
Figure 16:
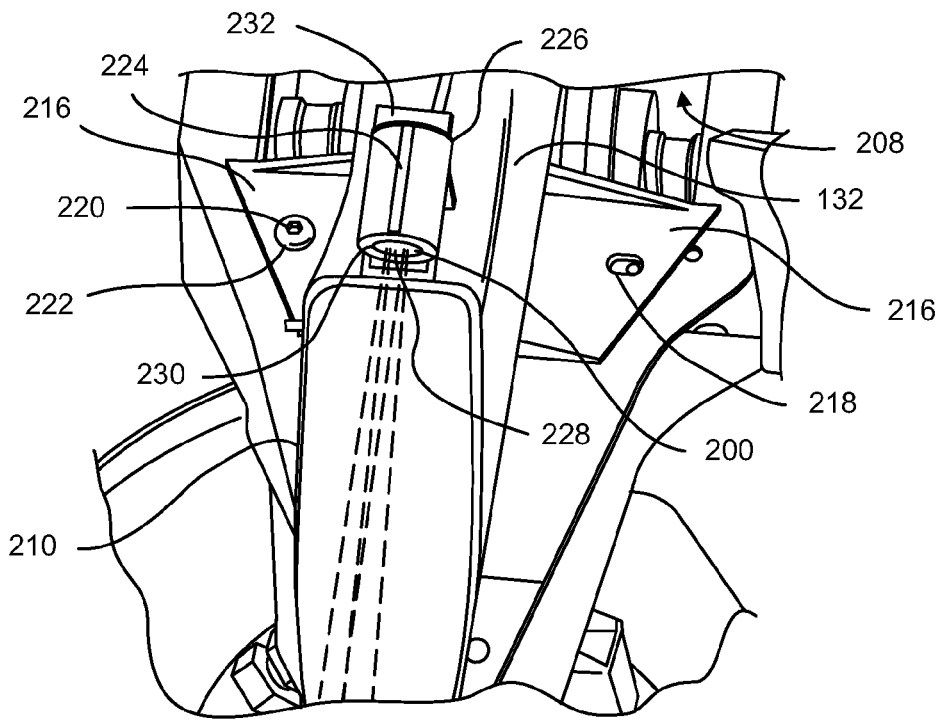
FIG. 16 shows a close-up view of the laser alignment device of FIG. 15 positioned on a receptacle on the dust chute.
Figure 17:
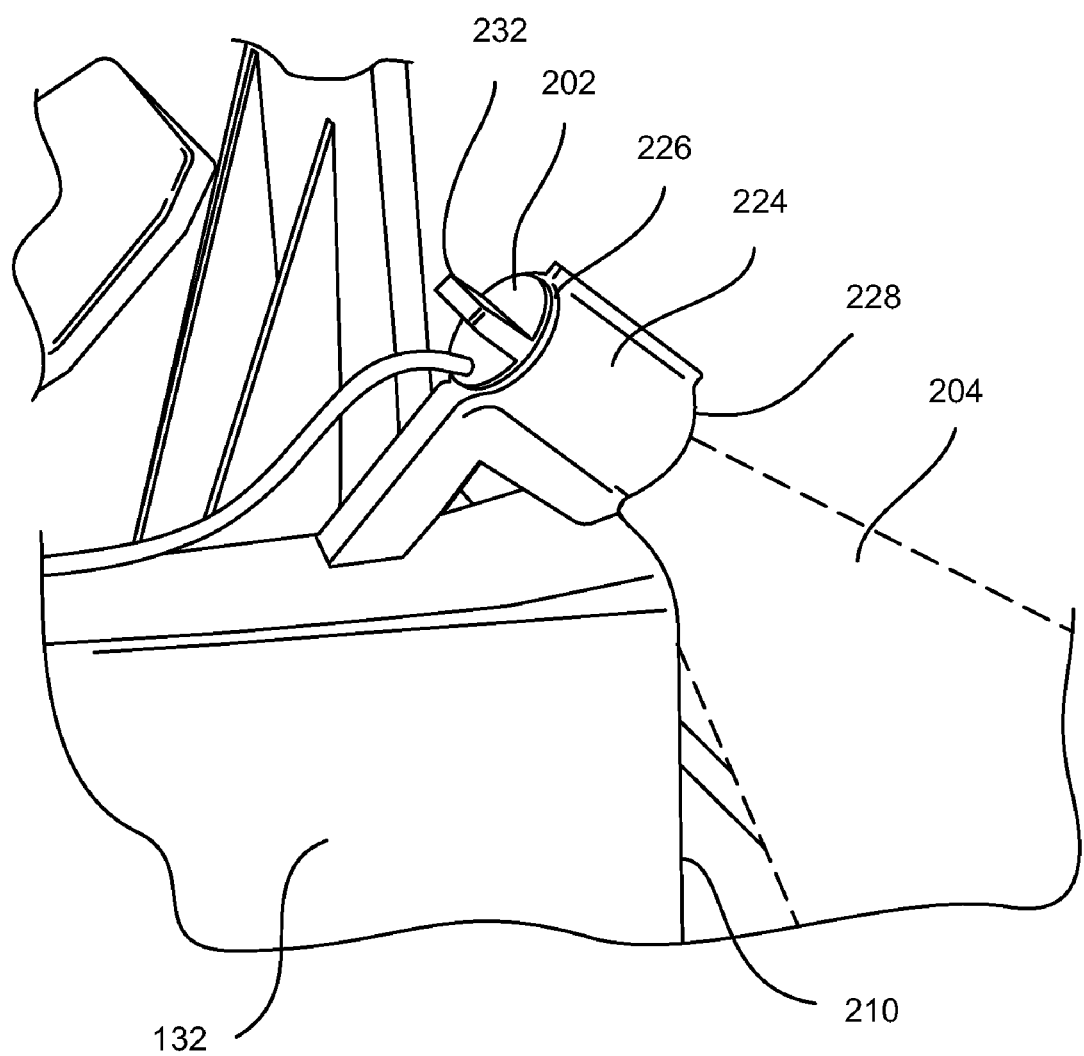
FIG. 17 shows a side view of the laser alignment device positioned in the receptacle of FIG. 16.

As best seen in FIGS. 15 and 16, the dust chute 132 includes a plurality of mounting tabs 216 attached to the lower portion of the funnel body 212. An elongated lateral slot 218 is provided in each mounting tab 216. A fastener in the form of a threaded screw or bolt 220 extends through the elongated slot 218 of each mounting tab 216 and into a threaded hole in the bevel arm 116. A shaft of the fastener 220 passes through the elongated slot 218, but the diameter of slot 218 is slightly larger than the diameter of the shaft, at least in the elongated direction of the slot. The fastener also includes a head 222 that is forced against the tabs 216 of the dust chute 132 when the fastener is tightened in the associated hole of the bevel arm 116. This secures the dust chute 132 in place on the bevel arm 116.

A receptacle 224 is positioned on an upper portion of the funnel body 212 of the dust chute 132. The receptacle 224 is configured to receive the laser alignment device 200 and retain the laser alignment device 200 in place on the dust chute 132. In the embodiment of FIGS. 13-17, the receptacle 224 is provided as a cup shaped member configured to releasably hold the cylindrical cartridge of the laser alignment device 200. The cup shaped receptacle 224 includes an upper opening 226 and a lower opening 228. The upper opening 226 is designed and dimensioned to pass the cartridge of the laser alignment device 200 such that laser alignment device may be inserted into the receptacle 224. The laser alignment device 200 is held in place in the receptacle 224 by a friction fit. In addition, a lower lip 230 may be provided around the lower opening 228 that prevents the laser alignment device 200 from passing through the lower opening 228 when it is inserted into the receptacle 224. The lip 230 provides a lower seat that engages the cartridge of the laser alignment device and prevents the cartridge from passing through the lower opening 228. However, the lower opening 228 is sufficient in size to allow the laser beams generated by the laser alignment device 200 to be emitted out of the receptacle 224 toward the table 104.

The laser alignment device 200 is inserted into the receptacle from the upper opening 226 with its optics facing the lower opening 228. The laser alignment device may include a tab 232 on the rear portion of the device that facilitates insertion into and removal from the receptacle 224. The tab 232 also facilitates rotation of the laser alignment device 200 within the receptacle to allow adjustment of the laser alignment device 200 within the receptacle. The receptacle 224 is oriented on the dust chute 132 such that the laser beams generated by the alignment device 220 will be emitted toward the table 104. As best seen in FIG. 16, the laser generator 202 may cause a first laser beam 204 and a second laser beam 206 to be emitted from the cartridge 202. The first laser beam 204 is directed along one side of the cutting blade 110 toward the table 104, and the second laser beam 206 is directed along the opposite side of the cutting blade 110 toward the table.

The positioning of the laser alignment device on the dust chute provides an unobstructed path for the laser beams 204, 206 to the cutting surface 104. This path remains unobstructed by the cutting head 106 and other parts when the cutting head 106 is moved toward and away from the table 104 during the cutting process. Because the laser beams 204, 206 pass alongside the blade 110, a user is provided with an indication of where the blade 110 will pass during a cutting stroke by viewing the area between the laser beams 204, 206. Furthermore, the unobstructed path of the laser beams 204, 206 to the cutting surface remains even when the cutting head is moved to a bevel angle by pivoting the bevel arm 116. This is possible because the dust chute 132 and attached laser alignment device 200 are mounted directly on the bevel arm 116 and pivot with the bevel arm 116. Although two light beams 204, 206 are shown in the embodiment of FIG. 16, it will be recognized that in other embodiments the laser generator may emit only a single beam of light toward the table 104.

The dust chute 132 may be easily adjusted in the event the laser alignment device becomes slightly misaligned. For example, if a user finds that one of the laser beams 204, 206 is shining on the blade 110 instead of the cutting surface, the user will want to adjusted the laser alignment device 200 such that it shows the proper cutting path. In this case, the user may first try to rotate the laser alignment device 200 within the receptacle 224 in an attempt to obtain proper orientation of the laser beams. If this does correct the misalignment, the user may attempt to obtain proper orientation of the laser beams by adjusting the position of the dust chute 132 and connected laser alignment device 200 relative to the bevel arm 116. In particular, the elongated form of the slots 218 on the mounting tabs 216 of the dust chute 132 allows the dust chute 132 to be moved in a lateral direction. To accomplish this adjustment, the fasteners 220 are slightly loosened such that the head of each fastener 220 is moved away from the associated tab 216. The dust chute 132 may be then be shifted in a lateral direction on the bevel post 116, causing the laser alignment device 200 to be re-positioned relative to the cutting blade 110. Once the dust chute is moved to a position where the laser alignment device 200 is properly oriented, the screws 220 may be re-tightened in order clamp the heads 222 of the screws 220 against the mounting tabs 216 and fix the dust chute 132 in place on the bevel arm 116.

Extendable Work Surface

With reference now to FIGS. 18-21, the miter saw assembly includes a base 102 with an extendable work surface 240 provided on the base. The work surface 240 is provided by the upper surface 105 of the turn table 104 and the upper surface 131 of the support extensions 130 which are positioned to the side of the table 104. The upper surface 131 of the support extensions 130 are substantially planar with respect to the upper surface 105 of the turn table 104. The work surface 240 is designed to hold a work piece (not shown) to be cut by the miter saw.

The base 102 is designed to sit in a stationary position on a solid surface, such as the surface of a work bench. The base is generally comprised of a hard metal material, such as aluminum, and provides a stationary frame that supports the remaining components of the miter saw 100. In the disclosed embodiment, the base includes a plurality of rubber feet 242 (see FIG. 19) which help to level the base 102 and stabilize the base on the solid surface upon which the base rests.

Figure 19:
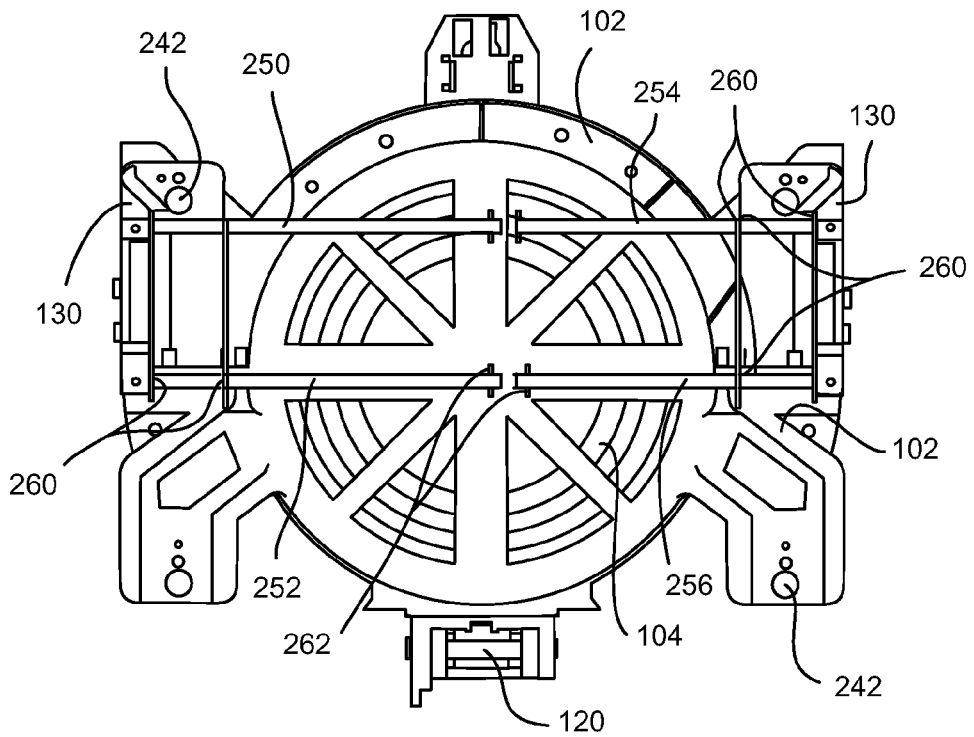
FIG. 19 shows a bottom view of the miter saw assembly of FIG. 18 showing slideable guide rods extending through the base.
Figure 21:
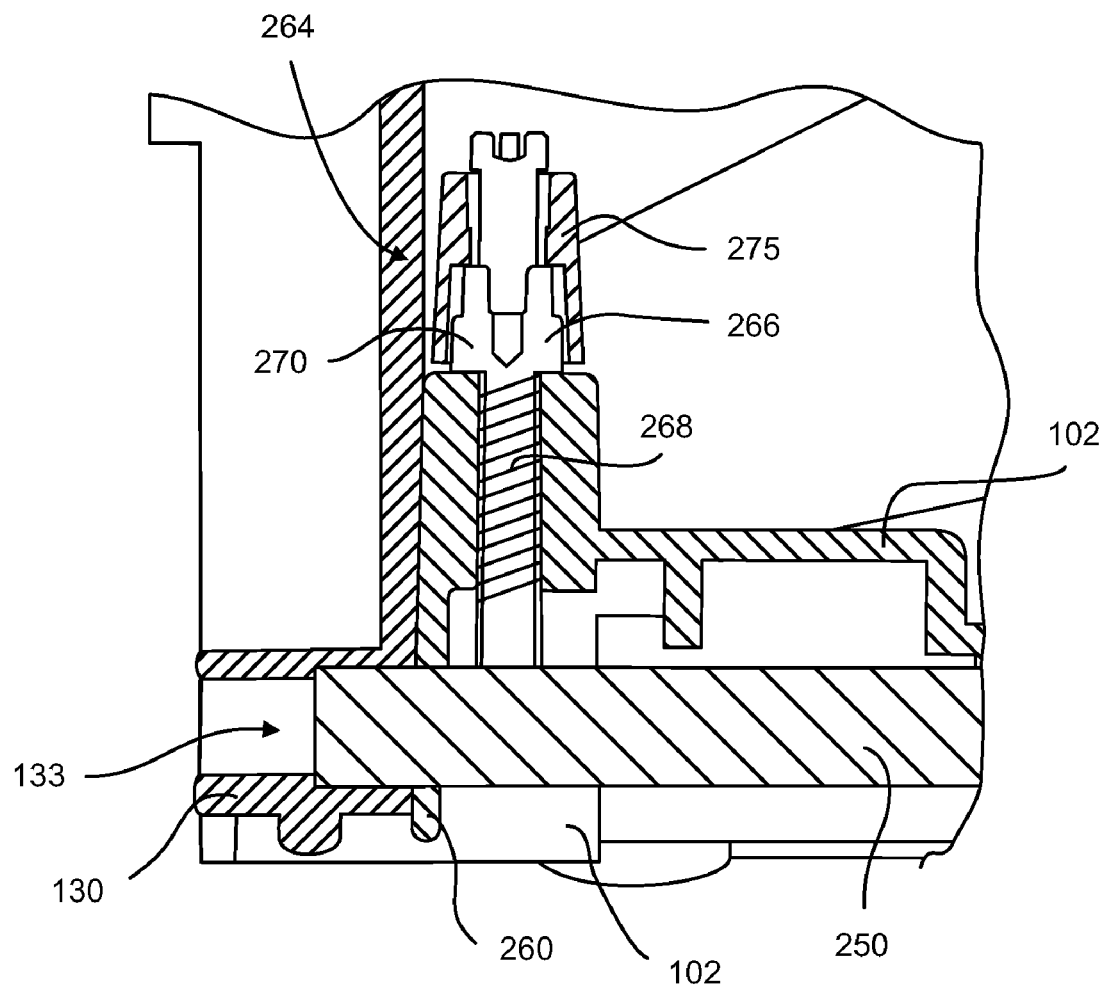
FIG. 21 shows a cross-sectional view of a locking arrangement for the work surface extensions of FIG. 20B.

Four guide members in the form of rods 250, 252, 254, 256 extend under the base 102 and slideably connect the extensions 130 to the base 102. The guide rods are slideably retained in bearing members 260 positioned at various locations on the bottom side of the base 102. The guide rods 250, 252, 254, 256 may be provided in various forms, such as, for example solid metallic rods or beams, plastic tubing, extrusion profiles (which may or may not be circular), or other elongated members. In the disclosed embodiment, the bearing members 260 are provided as small support ribs with holes with the guide rods running through the holes. FIG. 21 specifically shows a cross-sectional view of the base 102 with a guide rod 250 extending through a hole in the support rib bearing member 260. As shown in FIG. 19, stop members in the form of clips 262 are provided at the end of each rod 250, 252, 254, 256 to prevent the rod from sliding completely through the bearing members 260. The locking clips 262 may be E-ring type snap rings but may alternatively be cotter pins, dowel pins, o-rings, screw heads, or any other arrangement capable of providing an outer stop so the guide rods 250, 252, 254, 256 do not pass through the bearing members 260 and separate from the base 102.

The support extensions 130 of the miter saw assembly 100 are fixed to the guide rods 250, 252, 254, 256. A left extension is connected to guide rods 250 and 252, and a right extension is connected to guide rods 254 and 256. As shown in FIG. 21, guide rod 250 engages a channel 133 in the extension 130. The guide rod 250 may be secured in the channel 133 of the support extension 130 by any of various means, such as, for example, a friction fit, adhesives, or a fastener such as a screw or bolt.

The upper surface 131 of the extensions 103 have a polygonal, substantially trapezoidal shape. However, an interior edge 246 of each surface 131 is arcuate in shape to match the circular perimeter of the turn table 104. These arcuate edges 246 are positioned adjacent to the circular table top 105 of the turn table 104 when the base is in a compact position, such as that shown in FIGS. 18 and 20A. The support extensions 130 may be provided in any of various forms such as cast aluminum, molded plastic, or any other form sufficient to provide a substantially flat horizontal surface for work-piece support.

The turn table 104 is generally circular in shape and is rotatably mounted upon the base 102. The turn table 104 is configured to rotate about a central axis. A locking device 244 is provided on the base 102 to allow a user to lock the turn table in a selected position relative to the base. As discussed previously, the bevel arm 116 is pivotably mounted upon the turn table 104, allowing a user to orient the cutting head 106 at an angle relative to the table surface 105.

Figure 20A:
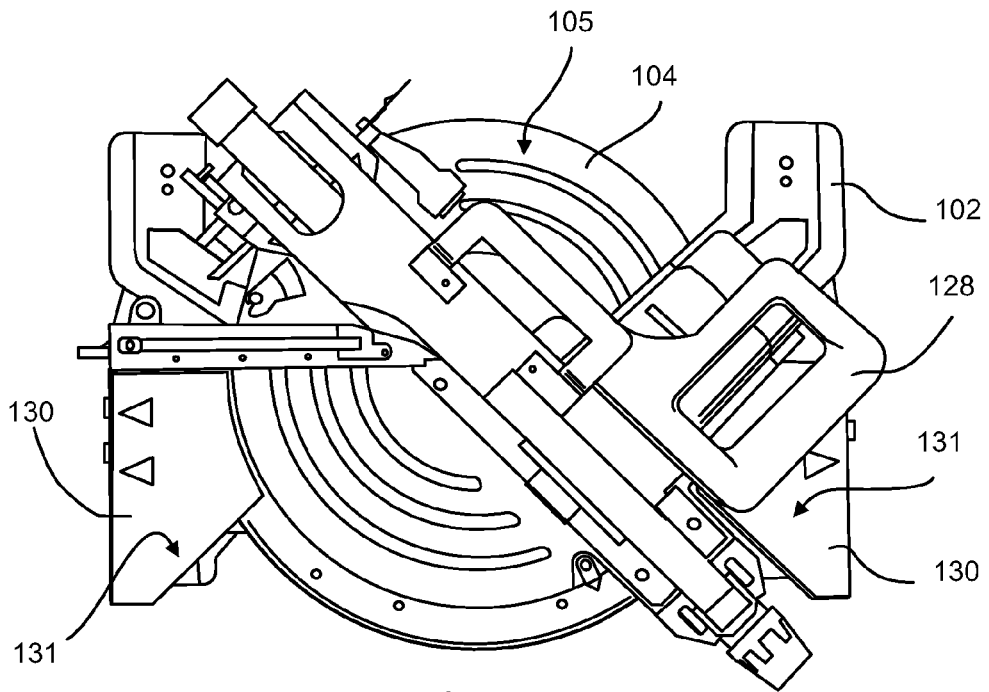
FIG. 20A shows a top view of the miter saw assembly of FIG. 18 with the work surface extensions in a retracted position.
Figure 20B:
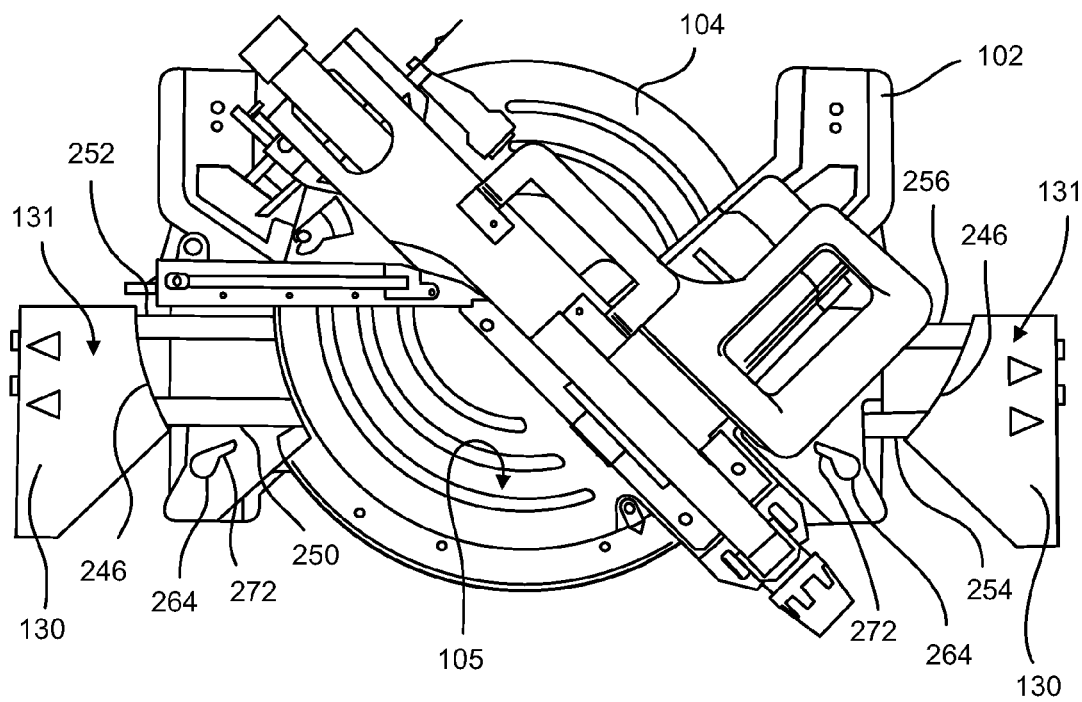
FIG. 20B shows a top view of the miter saw assembly of FIG. 20A with the work surface extensions in an extended position.

With reference now to FIGS. 20A and 20B, the extensions 130 are configured to move between a compact position (shown in FIG. 20A) and an extended position (shown in FIG. 20B). When in the compact position of FIG. 20A, the upper surfaces 131 of the extensions 130 are in close proximity to the surface 105 of the turn table and separated by a small air gap (e.g., less than one inch apart), with the arcuate inner edges 246 of the extensions 130 facing the circular edges of the turn table 104.

The extensions 130 and their associated surfaces 131 may be extended out from the extreme inward position shown in FIG. 20A by sliding the extensions 130 away from the turn table 104. The extensions 130 and associated surfaces 131 may be extended as far as an extreme outward position as shown in FIG. 20B. As the extensions 130 are extended outward, the guide rods 250, 252, 254, 256 slide on the bearing 260 surfaces. The bearings 260 allow the guide rods 250, 252, 254, 256 to slide outward until the locking clips 262 of the guide rods contact the bearings 260, thus preventing further outward movement of the guide rods 250, 252, 254, 256. When in the extended position of FIG. 20B, the upper surfaces 131 of the extensions 130 are substantially removed from the upper surface 105 of the turn table 104 (e.g., six or more inches apart), with no work support surfaces positioned in-between. Instead, when in the extended position of FIG. 20B, only portions of the saw 100 below the work support surfaces 105 and 131 are positioned between the work support surfaces 105 and 131. In particular, moving the extensions 130 outward exposes portions of the base 102 and the guide rods 250, 252, 254, 256 (which are fixed to the extensions 130 and slideably engage the bearing members 260 on the underside of the base 102).

When the extensions 130 are moved to their desired position, locking devices 264 may be used to secure the guide rods and associated extensions in place. As shown in FIG. 21, each locking device 264 comprises a screw 266 that extends through a hole in the base to contact a guide rod 250. The screw 266 includes threads 268 that engage complimentary threads in the base. A lever 272 is connected to the head 270 of the screw 266. Rotation of the lever 272 results in rotation of the associated screw 266. When the lever 272 is rotated to drive the screw 266 downward, the bottom portion of the screw 266 serves as a locking post that comes into contact with the guide rod 250 and prevents the guide rod from sliding. This effectively locks the extensions 130 and their associated support surfaces 131 in place relative to the turn table 104. While FIG. 21 shows one example of a locking arrangement, various other acceptable arrangements will also be recognized. For example, in one alternative locking arrangement, each guide rod would run through a spring loaded piece of steel. The steel would be configured to pivot and compress a spring to allow the rod to extend. Release of the steel piece would cause the spring to force the edge of the steel into the rod and lock it.

Figure 18:
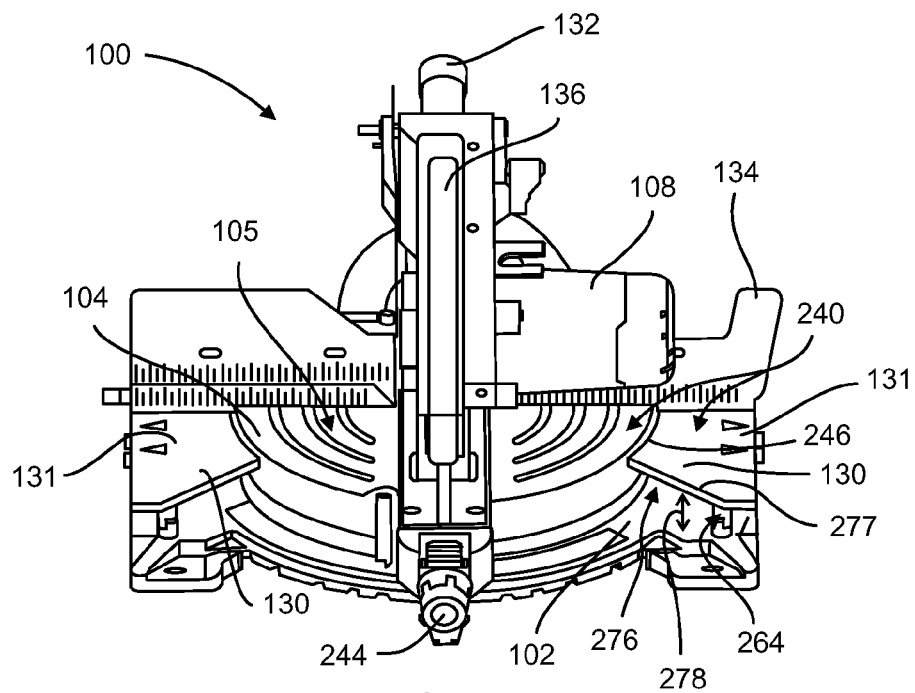
FIG. 18 shows a front perspective view of the miter saw assembly of FIG. 1 with work surface extensions shown on the sides of the turntable.

As best seen in FIG. 18, the locking devices 264 are situated under the extensions 130 when the extensions are in the retracted position. In order to allow access to the locking devices 264, an opening 276 is formed between a forward edge 277 of each work surface extension 130 and a portion of the base 102 that is directly below the forward edge 277 of the extension 130. In at least one embodiment, the opening 276 defines a distance 278 of at least 25 mm between the forward edge 277 of the work surface extension and the base 102. This distance 278 between the forward edge 277 of the work surface extension 130 and the base 102 provides a sufficiently sized opening to allow a user some degree of access to the space under the work surface extension 130 when the work surface extension is in the retracted position. This clearance distance 278 also allows the locking devices to move out from under the work surface extensions when the extensions 130 are moved to the extended position and back under the work surface extensions when the extensions 130 are moved to the retracted position.

As described above, the arrangement shown in FIGS. 18-21 provides for a miter saw with an extendable work surface that also has a reduced footprint. The arrangement provides for a compact miter saw assembly where the guide rods 250, 252, 254, and 256 slide out from and retract back into the underside of the base 102. Furthermore, the embodiment of FIGS. 18-21 makes efficient use of limited surface area by eliminating any completely fixed support surface portions and instead using the rotatable turn table 104 and movable work piece extensions 130. This further reduces the overall footprint of the miter saw 100 which is advantageous for shipping, storage, or transportation of the saw.

Multi-Position Bevel Toggle

Figure 22A:
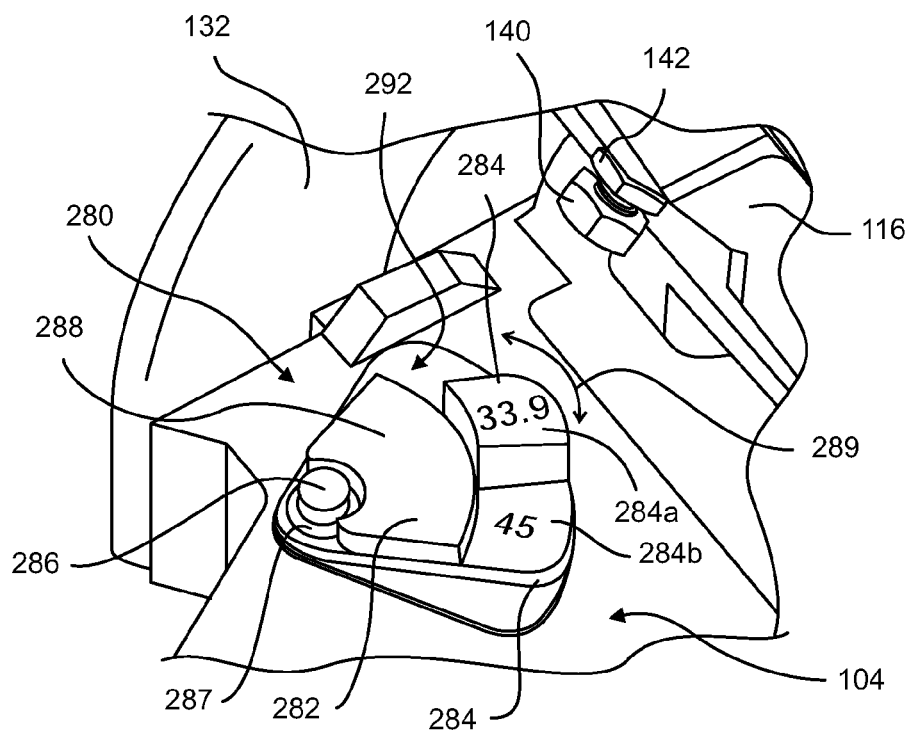
FIG. 22A shows a perspective view of a multi-position bevel stop toggle for use with the miter saw arrangement of FIG. 1.
Figure 22B:
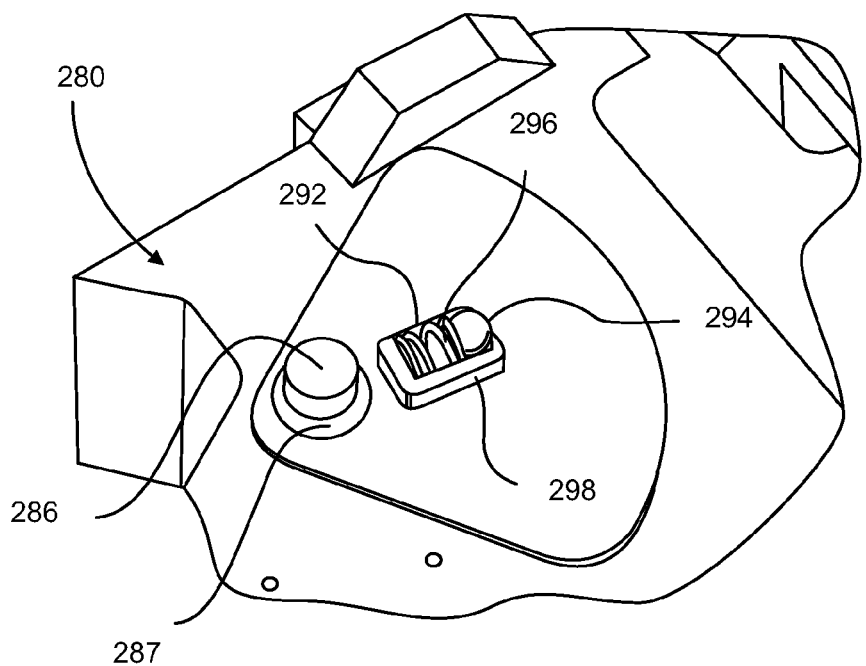
FIG. 22B shows a perspective view of retaining features for use with the bevel stop toggle of FIG. 22A.

With reference now to FIGS. 22A and 22B, the miter saw assembly includes a bevel stop member in the form of a multi-position toggle arrangement 280. The multi-position toggle arrangement 280 comprises a toggle piece 282 that is pivotably mounted to the table 104. The toggle piece 282 is configured to engage a protrusion 140 provided on the bevel post 116 in the form of an adjustable stop bolt. The stop bolt 140 includes a shaft with an enlarged head that contacts the toggle piece 282 in order to stop the bevel post 116 in a desired bevel position. The shaft of the stop bolt 140 threadedly engages a hole in the bevel post 116. Rotation of the stop bolt 140 places the head of the bolt 140 closer or further from the bevel post. A locking nut 142 is provided in association with the bolt 140 to lock the bolt 140 in the desired position relative to the bevel post 116.

In the embodiment of FIG. 22A, the toggle piece 282 is a pie-shaped member including a plurality of surface stops 284, a bridge portion 288, and a pivot hole that receives a shoulder screw 286. The shoulder screw 286 extends through the pivot hole and into a hole in the table 104. The toggle piece 282 is allowed to rotate about this shoulder screw 286 as noted by arrow 289. In at least one alternative embodiment, the pivot hole of the toggle piece is configured to slide over a boss on the table top and the shoulder screw 286 which has a larger diameter head than the boss holds the toggle piece 282 in place.

As shown in FIG. 22A, the bridge portion 288 is provided between the shoulder screw 282 and the stops 284. A spring (not shown in FIG. 22A or 22B) may be provided between the head of the shoulder screw 286 and a washer 287 that rests on the toggle piece 282. The spring biases the toggle piece 282 toward the table 10 and prevents the toggle piece 282 from rattling during use of the saw 100. This arrangement also provides the user with some resistance when rotating the toggle piece 282.

With continued reference to FIG. 22A, the plurality of stops 284 are provided as various blocks having upper surfaces that extend to different heights above table 104. The plurality of stops 284 include a first stop 284a and a second stop 284b. Each stop 284 includes an upper surface that is configured to engage the stop bolt 140 to stop movement of the bevel post 116 at a desired bevel angle. The upper surfaces on the stops 284 may be inclined relative to the table 104 so that the force from the stop bolt 140 produces only minimal horizontal reactions on the toggle piece 282.

In the embodiment of FIG. 22A, the first stop 284a is configured to engage the stop bolt 140 when the bevel post 116 is rotated to a 33.9 degree bevel. The second stop 284b is configured to engage the stop bolt 140 when the bevel post 116 is rotated to a 45 degree bevel. Indicia are provided on the stops 284 to indicate the angle at which the bevel post 116 will stop. In particular, the first stop 284a includes a "33.9°" inscription and the second stop 284b includes a 45° inscription. Alternatively, the bevel stop angle for each stop 284 may be indicated on the table 104.

While two surface stops are shown in FIG. 22A, it will be recognized that the multi-position toggle arrangement 280 may further include a third stop block (not shown) having an upper surface which stops the bevel post 116 at a different bevel angle than the first and second stops 284 (i.e., an angle greater than 45 degrees). In the embodiment of FIG. 22A, a void 292 is provided at a third stop position. In this case, the third stop position is reached when the toggle 282 is swung to a position where it will not contact the stop bolt 140 on the bevel post 116. With the toggle 282 in this position, the bevel post 116 is free to pivot until a dead stop feature (not shown) cast into the bevel post 116 hits a cast stop feature on the surface of the table 104 (e.g., at a 48 degree or other angle in excess of 45 degrees). Accordingly, the toggle provides a plurality of stop positions, including a 33.9 degree first stop, a 45 degree second stop, and a third stop in excess of 45 degrees.

With reference now to FIG. 22B, the multi-position toggle arrangement 280 is shown with the toggle piece 282 removed to expose retaining features in the form of a detent arrangement 292. Any of three toggle positions on the toggle piece 282 may be selected using the detent 292. In the embodiment of FIG. 22B, the detent 292 is provided by a ball 294 and spring 296 held within a detent wall 298. The ball 294 is biased outward from an opening in the detent wall 298 by the spring 296. The opening is smaller than the diameter of the ball 294 so that the ball does not completely escape the wall 298. The detent wall 298 may be cast as part of the table, as shown in FIG. 22B. Alternatively, the detent wall 298 may be separate from the table 104 and fixed to the table with fasteners.

The ball 294 of the detent arrangement 292 is dimensioned to engage complimentary divots (not shown) on the interior of the toggle piece 282. Each divot is associated with one of the stops 284. Thus, as the toggle piece 282 is rotated to a desired position, the ball 294 will be forced into the divot associated with the selected stop 284, thus holding the toggle piece 282 in place on the table 104. If a new stop 284 is desired, the user rotates the toggle piece 282, forcing the ball 294 out of the divot as the toggle piece 282 is rotated. The ball 294 will then fall into a new divot when the toggle piece 282 is properly rotated to a new desired position.

The detent 292 of FIG. 22B provides an arrangement that does not cause the toggle device 282 to lift up off the table 104. Instead, the detent arrangement 292 pushes in a horizontal plane relative to the table, preventing dust and other debris from getting caught beneath the toggle 282 and in the detent. However, other detent configurations are possible for use with the multi-position toggle arrangement 280, including vertical detent orientations. In one alternative embodiment, the ball and spring shown in FIG. 22B are replaced by a ball plunger set screw that is screwed into a threaded block on the table. Similar to the arrangement of FIG. 22B, the ball plunger falls into each of the detent divots in the toggle piece in order to stop the toggle at its desired location.

Figure 23:
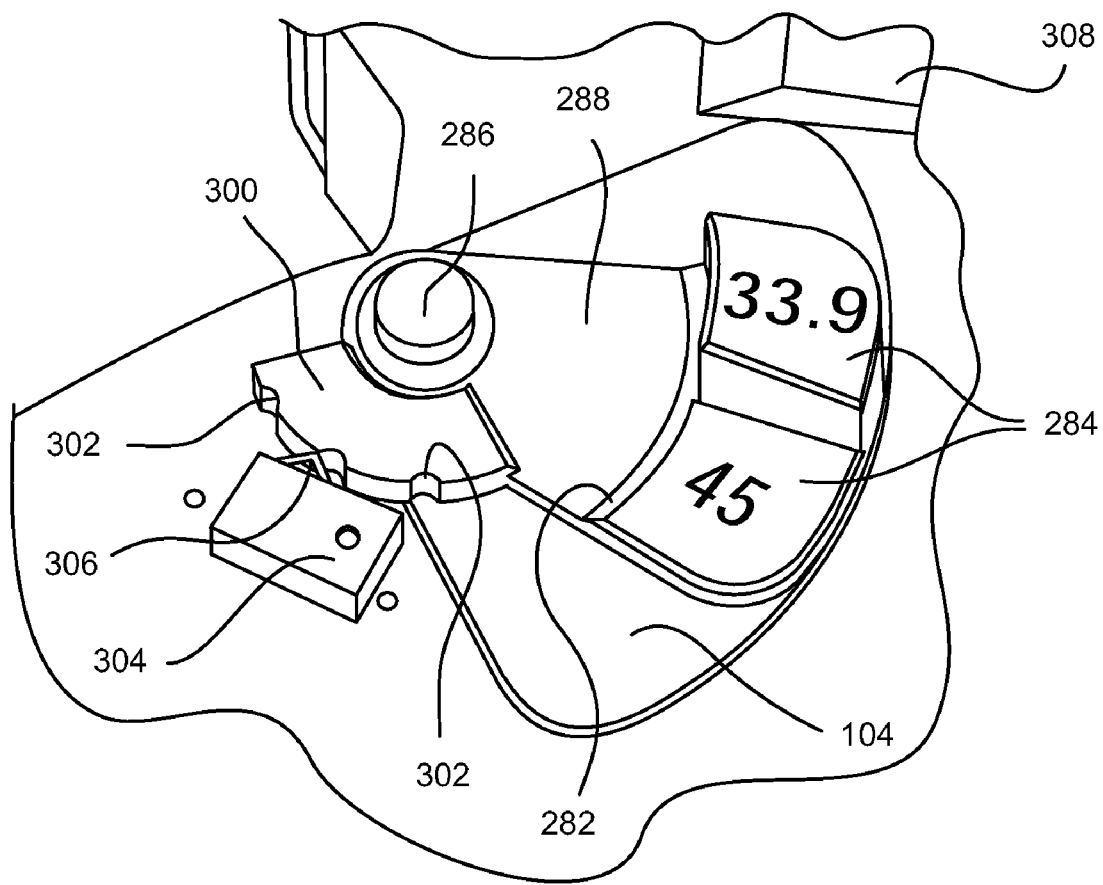
FIG. 23 shows an alternative embodiment of the multi-position bevel stop toggle of FIG. 22A.

FIG. 23 shows another alternative arrangement for the multi-position toggle arrangement 280. In this embodiment, the toggle piece 282 includes a fan-shaped block 300 positioned on the bridge portion 288 near the shoulder screw 286. Three indentations in the form of divots 302 are formed in the fan-shaped block. Each divot 302 is associated with a stop position for the toggle piece 282 and the related stops 284. The detent arrangement includes a detent block 304 with a V-shaped cantilever spring 306. The V-shaped cantilever spring 306 is configured to pivot such that it engages and disengages the various divots 302 on the toggle piece 282. A protrusion 308 on the surface of the table 104 prevents the toggle piece 282 from rotating past one of the selectable positions. Similar to the arrangement of FIGS. 22A and 22B, as the toggle piece 282 is rotated to a desired position in the embodiment of FIG. 23, the cantilever spring 306 move into the divot 302 associated with the selected stop 284, thus holding the toggle piece 282 in place on the table 104. If a new stop 284 is desired, the user rotates the toggle piece 282, moving the cantilever spring 306 out of the divot as the toggle piece 282 is rotated. The cantilever spring 306 will then move into a new divot 302 when the toggle piece 282 is properly rotated to the desired position.

Although the present invention has been described with respect to certain preferred embodiments, it will be appreciated by those of skill in the art that other implementations and adaptations are possible. Moreover, there are advantages to individual advancements described herein that may be obtained without incorporating other aspects described above. Therefore, the spirit and scope of the appended claims should not be limited to the description of the preferred embodiments contained herein.

What is claimed is:

1. A miter saw comprising:
a base;
a bevel support pivotable with respect to the base between a plurality of bevel angles;
a cutting blade supported by the bevel support; and
a bevel stop member having a lower surface with a fixed height position relative to the base of the miter saw, and an upper portion formed with multiple surfaces at differing heights relative to the lower portion,
the bevel stop member moveably connected to the base between a plurality of stop positions, including a first stop position where the bevel stop member is configured to stop the bevel support at a bevel angle of less than forty-five degrees, a second stop position where the bevel stop member is configured to stop the bevel support at a bevel angle of about forty-five degrees, and a third stop position where the bevel stop member is configured to allow the bevel support to pivot to a bevel angle of greater than forty-five degrees.

2. The miter saw of claim 1 wherein the bevel stop member comprises a plurality of bevel stop surfaces configured to engage the bevel support, each of the plurality of bevel stop surfaces positioned at different heights from the base, the plurality of bevel stop surfaces including a first bevel stop surface associated with the first stop position, a second bevel stop surface associated with the second stop position.

3. The miter saw of claim 2 further comprising a protrusion on the bevel support, wherein the protrusion is configured to engage the first bevel stop surface when the bevel stop member is in the first stop position, and wherein the protrusion is configured to engage the second bevel stop surface when the bevel stop member is in the second stop position.

4. The miter saw of claim 3 wherein the protrusion comprises a stop bolt including a shaft threadedly engaging the bevel support and a head connected to the threaded shaft.

5. The miter saw of claim 3 further comprising a table positioned on the base, wherein the bevel stop member is pivotably connected to the table.

6. The miter saw of claim 5 further comprising a void formed in the bevel stop member, the void exposing the protrusion to the table when the bevel stop member is in the third stop position such that the bevel support is pivotable to the bevel angle of greater than forty-five degrees until the protrusion contacts the table.

7. The miter saw of claim 5 wherein each of the plurality of bevel stop surfaces is inclined relative to the table and includes indicia indicating the bevel angle associated with the bevel stop surface.

8. The miter saw of claim 1 further comprising a table positioned on the base, wherein the bevel stop member is pivotably connected to the table and wherein a spring biases the bevel stop member toward the table.

9. The miter saw of claim 1 wherein the bevel stop member comprises a plurality of indentations configured to engage a detent arrangement connected to the base, each of the indentations associated with one of the first stop position, the second stop position or the third stop position of the bevel stop member.

10. The miter saw of claim 9 wherein the detent arrangement includes a moveable ball retained within detent walls, the ball configured to engage one of the indentations in the bevel stop member in order to retain the bevel stop member in the first stop position, the second stop position or the third stop position.

11. A miter saw comprising:
a table;
a bevel support pivotable with respect to the table between a plurality of bevel angles;
a cutting blade supported by the bevel support;
a protrusion extending outwardly from the bevel support; and
a bevel stop member pivotably connected to the table between a plurality of positions, the bevel stop member including a first bevel stop surface and a second bevel stop surface, the first and second bevel stop surfaces positioned at different distances from the table, wherein the first bevel stop surface is configured to engage the protrusion when the bevel support is pivoted to a first bevel angle and the bevel stop member is in a first position, wherein the second bevel stop surface is configured to engage the protrusion when the bevel support is pivoted to a second bevel angle and the bevel stop member is in a second position, and wherein the bevel stop member is configured such that the protrusion will not contact either the first bevel stop surface or the second bevel stop surface when the bevel stop member is in a third position.

12. The miter saw arrangement of claim 11 wherein the protrusion comprises a stop bolt adjustably positioned on the bevel support, the stop bolt including a shaft threadedly engaging the bevel support and a head connected to the threaded shaft.

13. The miter saw of claim 12 further comprising a void formed in the bevel stop member, the void exposing the stop bolt to the table when the bevel stop member is in the third stop position.

14. The miter saw of claim 12 wherein each of the plurality of bevel stop surfaces is inclined relative to the table.

15. The miter saw of claim 12 wherein each of the plurality of bevel stop surfaces includes indicia indicating a bevel angle associated with the bevel stop surface.

16. The miter saw of claim 11 further comprising a spring configured to bias the bevel stop member toward the table.

17. The miter saw of claim 11 further comprising a detent arrangement connected to the table, wherein the bevel stop member comprises a plurality of indentations, each of the plurality of indentations configured to engage the detent arrangement and retain the bevel stop member in one of the first position, the second position or the third position.

18. The miter saw of claim 17 wherein the detent arrangement includes a moveable ball retained within detent walls secured to the table, the ball configured to engage one of the indentations in the bevel stop member in order to retain the bevel stop member in the first position, the second position or the third position.

19. The miter saw of claim 17 wherein the detent arrangement includes a cantilever spring pivotably secured to the table, the cantilever spring configured to engage one of the indentations in the bevel stop member in order to retain the bevel stop member in the first position, the second position or the third position.

20. A miter saw comprising:
a base;
a rotatable table positioned on the base, the table including a substantially planar table surface;
a bevel support pivotable with respect to the table between a plurality of bevel angles;
a cutting blade supported by the bevel support;
a stop bolt adjustably positioned on the bevel support; and
a bevel stop member pivotably connected to the table between a plurality of positions, the bevel stop member including a first bevel stop surface and a second bevel stop surface, the first and second bevel stop surfaces positioned at different distances from the table and inclined relative to the table, wherein the first bevel stop surface is configured to engage the stop bolt when the bevel support is pivoted to a bevel angle of less than forty-five degrees when the bevel stop member is in a first position, wherein the second bevel stop surface is configured to engage the stop bolt when the bevel support is pivoted to a bevel angle of about forty-five degrees when the bevel stop member is in a second position, and wherein the bevel stop member allows the bevel support to pivot to a bevel degree of greater than forty five degrees when the bevel stop member is in a third position.

* * * * *